United States Patent
Takanohashi et al.

(10) Patent No.: US 12,105,207 B2
(45) Date of Patent: Oct. 1, 2024

(54) RECEIVER AND CONTROL METHOD OF THE SAME

(71) Applicant: Sony Semiconductor Solutions Corporation, Kanagawa (JP)

(72) Inventors: Kazukuni Takanohashi, Tokyo (JP); Tetsuhiro Futami, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 751 days.

(21) Appl. No.: 16/973,255

(22) PCT Filed: Apr. 11, 2019

(86) PCT No.: PCT/JP2019/015768
§ 371 (c)(1),
(2) Date: Dec. 8, 2020

(87) PCT Pub. No.: WO2020/012743
PCT Pub. Date: Jan. 16, 2020

(65) Prior Publication Data
US 2021/0247521 A1 Aug. 12, 2021

(30) Foreign Application Priority Data
Jul. 9, 2018 (JP) ................. 2018-129594

(51) Int. Cl.
*G01S 19/17* (2010.01)
*G01S 19/34* (2010.01)
(Continued)

(52) U.S. Cl.
CPC .............. *G01S 19/17* (2013.01); *G01S 19/34* (2013.01); *H04W 4/80* (2018.02)

(58) Field of Classification Search
CPC ......... H04W 4/02; H04W 4/029; H04W 4/80; G01S 19/17; G01S 19/34; G01S 19/01; G01S 19/00
See application file for complete search history.

(56) References Cited

U.S. PATENT DOCUMENTS

| 9,398,619 B1* | 7/2016 | Sennett | H04W 4/021 |
| 2007/0195074 A1* | 8/2007 | Gelissen | G06F 1/3228 |
| | | | 345/204 |

(Continued)

FOREIGN PATENT DOCUMENTS

| JP | 2006-17735 A | 1/2006 |
| JP | 2008-89582 A | 4/2008 |

(Continued)

OTHER PUBLICATIONS

International Search Report, International Application No. PCT/JP2019/015768, dated May 27, 2019.

(Continued)

*Primary Examiner* — Jinsong Hu
*Assistant Examiner* — Farideh Madani
(74) *Attorney, Agent, or Firm* — Michael Best & Friedrich LLP

(57) ABSTRACT

To reduce power consumption of a receiver that acquires its current position by using a signal from a satellite.

The receiver includes a reception section, a signal processing section, and a positioning process section. In this receiver, the reception section receives a signal from a predetermined satellite as a reception signal. The signal processing section performs a process of determining whether or not a reception signal received from the reception section includes a specific message. The positioning process (Continued)

section performs a positioning process of acquiring a current position in a case where the reception signal includes a specific message.

15 Claims, 20 Drawing Sheets

(51) Int. Cl.
*H04W 4/80* (2018.01)
*H04W 4/90* (2018.01)

(56) References Cited

U.S. PATENT DOCUMENTS

| | | | |
|---|---|---|---|
| 2009/0066564 A1 | 3/2009 | Burroughs et al. | |
| 2009/0221261 A1* | 9/2009 | Soliman | H04W 88/04 455/343.2 |
| 2010/0273444 A1* | 10/2010 | Wu | H04W 4/90 455/404.1 |
| 2014/0315513 A1* | 10/2014 | Long | H04W 4/90 455/404.2 |
| 2018/0123821 A1* | 5/2018 | Alberth, Jr. | H04W 4/33 |
| 2018/0206100 A1* | 7/2018 | Eisner | H04W 12/02 |
| 2019/0019401 A1* | 1/2019 | Han | G08B 25/14 |
| 2019/0335307 A1* | 10/2019 | Marzorati | H04W 4/90 |
| 2020/0110182 A1* | 4/2020 | Kumabe | G01S 19/22 |

FOREIGN PATENT DOCUMENTS

| | | |
|---|---|---|
| JP | 2009-92473 A | 4/2009 |
| JP | 2009-270884 A | 11/2009 |
| JP | 2010-540891 A | 12/2010 |
| JP | 2015-23517 A | 2/2015 |

OTHER PUBLICATIONS

N. Shimizu et al., "Quasi-Zenith Satellite System, Development status of Satellite Report for Disaster and Crisis Man agreement," Proceedings of the 59th Space Sciences and Technology Conference [CD-ROM], Oct. 7, 2015, 59th, Rombun No. 3H04, non-official translation.

S. Shinagawa, "Regarding disaster and crisis information using satellites and its application to autonomous moving body", Master's thesis of Graduate School of Tokyo University of Marine Science and Technology, Tokyo University of Marine Science and Technology, pp. 1-55, Mar. 2015.

* cited by examiner

| MT (Message Type) | Description |
|---|---|
| 43 | DC Report (JMA Disaster Prevention Information) |
| 44 | DC Report (Other Organization) |

FIG.10

| Disaster Category Code | Description |
|---|---|
| 1 | JMA-DC Report (Earthquake Early Warning) |
| 2 | JMA-DC Report (Seismic Center) |
| 3 | JMA-DC Report (Seismic Intensity) |
| 4 | JMA-DC Report (Tokai Earthquake) |
| 5 | JMA-DC Report (Tsunami) |
| 6 | JMA-DC Report (Northwest Pacific Tsunami) |
| 7 | Unused |
| 8 | JMA-DC Report (Volcano) |
| 9 | JMA-DC Report (Ash Fall) |
| 10 | JMA-DC Report (Weather) |
| 11 | JMA-DC Report (Flood) |
| 12 | JMA-DC Report (Typhoon) |
| 13 | Unused |
| 14 | JMA-DC Report (Marine) |

FIG.11

| Report Classification | DC Report | |
|---|---|---|
| | Disaster Type | Conditions |
| Maximum priority (MAXIMUM PRIORITY) | JMA Disaster Prevention Information (Earthquake Early Warning) | - |
| | JMA Disaster Prevention Information (Tsunami) *Warning | Warning codes: One of the following<br>·TSUNAMI WARNING<br>·MAJOR TSUNAMI WARNING<br>·MAJOR TSUNAMI WARNING IN EFFECT |
| Priority (PRIORITY) | JMA Disaster Prevention Information (Seismic Center) | - |
| | JMA Disaster Prevention Information (Seismic Intensity) | - |
| | JMA Disaster Prevention Information (Tokai Earthquake) | Tokai Information Number:<br>·TEMPORARY |
| | JMA Disaster Prevention Information (Northwest Pacific Tsunami) | - |
| | JMA Disaster Prevention Information (Volcano) *Equivalent to Maximum priority | Disaster Prevention Information Element: One of the following<br>·LEVEL 4 (PREPARE TO EVACUATE)<br>·LEVEL 5 (EVACUATE)<br>·EXTREME CAUTION ADVISED AT FOOT OF MOUNTAINS<br>·EXTREME CAUTION ADVISED IN RESIDENTIAL AREAS<br>·VOLCANIC WARNING: EVACUATION, ETC.<br>·VOLCANIC WARNING: EXTREME CAUTION ADVISED AT FOOT OF MOUNTAINS CONCERNED<br>·VOLCANIC WARNING: EXTREME CAUTION ADVISED IN RESIDENTIAL AREAS CONCERNED<br>·ERUPTION<br>·POSSIBLE ERUPTION |
| | JMA Disaster Prevention Information (Ash Fall) | - |
| | JMA Disaster Prevention Information (Weather) *Warning | Issue State:<br>·IN EFFECT |
| | JMA Disaster Prevention Information (Flood) *Warning | Alert levels: One of the following<br>·INFORMATION TO PROVIDE WARNING ON FLOODING<br>·INFORMATION ON POTENTIAL FLOOD HAZARDS<br>·INFORMATION ON FLOODING |

FIG.12

| Report Classification | DC Report | |
|---|---|---|
| | Disaster Type | Conditions |
| Regular (MEDIUM) | JMA Disaster Prevention Information (Tokai Earthquake) | Tokai Information number:<br>·END |
| | JMA Disaster Prevention Information (Tsunami)<br>*Cancellation of warning | Warning codes: One of the following<br>·NO TSUNAMI<br>·WARNING LIFTED |
| | JMA Disaster Prevention Information (Volcano)<br>*Equivalent to warning | Disaster Prevention Information Element:<br>One of the following<br>·VOLCANIC INFORMATION<br>·NEAR-CRATER WARNING<br>·VOLCANIC WARNING (SEA AREAS)<br>·LEVEL 2 (DO NOT APPROACH CRATER)<br>·LEVEL 3 (DO NOT APPROACH VOLCANO)<br>·CAUTION ADVISED AROUND CRATER<br>·EXERCISE CAUTION WHEN APPROACHING VOLCANO<br>·VOLCANIC MARINE WARNING (VOLCANIC WARNING)<br>·CAUTION ADVISED FOR SEA AREA IN VICINITY OF VOLCANO<br>·VOLCANIC WARNING: DO NOT APPROACH VOLCANO, ETC.<br>·NEAR-CRATER WARNING: DO NOT APPROACH VOLCANO, ETC.<br>·VOLCANIC WARNING (AROUND VOLCANO): WARNING AROUND VOLCANO<br>·VOLCANIC WARNING: CAUTION ADVISED AROUND CRATER<br>·NEAR-CRATER WARNING: CAUTION ADVISED AROUND CRATER |
| | JMA Disaster Prevention Information (Volcano)<br>*Equivalent to cancellation of warning | Disaster Prevention Information Element:<br>One of the following<br>·VOLCANIC WARNING: VOLCANIC WARNING LIFTED<br>·VOLCANIC WARNING<br>·LEVEL 1 (POTENTIAL FOR INCREASED ACTIVITY)<br>·POTENTIAL FOR INCREASED ACTIVITY<br>·VOLCANIC MARINE WARNING (VOLCANIC WARNING LIFTED)<br>·VOLCANIC MARINE WARNING (VOLCANIC FORECAST)<br>·POTENTIAL FOR INCREASED ACTIVITY (SUBMARINE VOLCANO) |
| | JMA Disaster Prevention Information (Weather)<br>*Cancellation of warning | Issue State:<br>·LIFTED |
| | JMA Disaster Prevention Information (Flood)<br>*Cancellation of warning | Warning level:<br>·WARNING LIFTED |
| | JMA Disaster Prevention Information (Typhoon) | — |
| | JMA Disaster Prevention Information (Marine)<br>*Warning | Marine warning: One of the following<br>·MARINE ICE ACCRETION WARNING<br>·MARINE DENSE FOG WARNING<br>·MARINE SEA SWELL WARNING<br>·MARINE WIND WARNING<br>·MARINE GALE WARNING<br>·MARINE STORM WARNING<br>·MARINE TYPHOON WARNING |
| | JMA Disaster Prevention Information (Marine)<br>*Cancellation of warning | Marine warning:<br>·MARINE WARNING LIFTED |

FIG.13

| Action | Transmission Conditions | |
|---|---|---|
| Start | When /jmx:Report/jmx_ib:Head/Info Type is "Issue" | |
| Update | When all the following conditions are satisfied:<br>・When /jmx:Report/jmx_ib:Head/Info Type is "Issue" or "Cancellation"<br>・When JMA-DC Report changed according to the update of JMA information | |
| End | When one of the conditions on the right is satisfied | When one of the following JMA-XML that have the same /jmx:Report/Cntrol/Title and /jmx:Report/jmx_ib:Head/EventID is received:<br>・32. Seismic Intensity Information<br>・33. Earthquake Information<br>・34,35. Earthquake and Seismic Intensity Information |
| | | When JMA-DC Report in which /jmx:Report/jmx_ib:Head/Info Type is "Issue" has been by five minutes |
| | | When JMA-DC Report in which /jmx:Report/jmx_ib:Head/Info Type is "Cancellation" has been by five minutes |

FIG. 14

| Code | Description |
|---|---|
| 0 | NONE |
| 101 | SLIGHT SEA-LEVEL CHANGES MAY BE OBSERVED IN COASTAL REGIONS. |
| 102 | SLIGHT SEA-LEVEL CHANGES MAY BE OBSERVED IN COASTAL REGIONS, BUT NO TSUNAMI DAMAGE IS EXPECTED. |
| 103 | SEA-LEVEL CHANGES MAY BE OBSERVED. |
| 104 | PAY ATTENTION WHEN FISHING, SWIMMING, OR ENGAGING IN OTHER MARINE ACTIVITIES, AS THERE MAY STILL BE SLIGHT SEA-LEVEL CHANGES. |
| 105 | PAY ATTENTION WHEN FISHING OR ENGAGING IN OTHER MARINE ACTIVITIES, AS THERE MAY STILL BE SLIGHT SEA-LEVEL CHANGES. |
| 107 | NO MAJOR TSUNAMI WARNINGS, TSUNAMI WARNINGS, OR ADVISORIES ARE CURRENTLY IN EFFECT. |
| 109 | EXERCISE EXTREME CAUTION IF TSUNAMI ARRIVES AT HIGH TIDE, AS THIS BOOSTS HEIGHT OF WAVES. |
| 110 | EXERCISE CAUTION IF TSUNAMI ARRIVES AT HIGH TIDE, AS THIS BOOSTS HEIGHT OF WAVES. |
| 111 | IN SOME COASTAL REGIONS, TSUNAMI WAVES HIGHER THAN THOSE RECORDED MAY HAVE ARRIVED. |
| 112 | TSUNAMI HEIGHT MAY BECOME HIGHER. |
| 113 | IN COASTAL REGIONS WHERE TSUNAMIS ARE ESTIMATED BASED ON OBSERVATIONS AT OFFSHORE GAUGE, EARLY TSUNAMIS HAVE PROBABLY ALREADY ARRIVED. |
| 114 | TSUNAMI WAVES MAY REACH THEIR MAXIMUM HEIGHT A FEW HOURS OR MORE AFTER THE ESTIMATED ARRIVAL TIME. |
| 115 | TSUNAMI OBSERVATION AT OFFSHORE GAUGE, AND TSUNAMI WILL BECOME EVEN HIGHER IN COASTAL REGIONS. |
| 121 | <MAJOR TSUNAMI WARNING><br>HUGE TSUNAMI IS EXPECTED TO HIT AND CAUSE SERIOUS DAMAGE. EVACUATE IMMEDIATELY FROM COASTAL REGIONS AND RIVERSIDE AREAS TO SAFER PLACE SUCH AS HIGH GROUND OR EVACUATION BUILDING. TSUNAMI WAVES ARE EXPECTED TO HIT REPEATEDLY. DO NOT LEAVE SAFE GROUND UNTIL WARNING IS LIFTED. |
| 122 | <TSUNAMI WARNING><br>DAMAGE DUE TO TSUNAMI WAVES IS EXPECTED. EVACUATE IMMEDIATELY FROM COASTAL REGIONS AND RIVERSIDE AREAS TO SAFER PLACE SUCH AS HIGH GROUND OR EVACUATION BUILDING. TSUNAMI WAVES ARE EXPECTED TO HIT REPEATEDLY. DO NOT LEAVE SAFE GROUND UNTIL WARNING IS LIFTED. |

FIG.15

| bit | Region Name |
|---|---|
| 1 | CENTRAL HOKKAIDO |
| 2 | SOUTHERN HOKKAIDO |
| 3 | NORTHERN HOKKAIDO |
| 4 | EASTERN HOKKAIDO |
| 5 | AOMORI |
| 6 | IWATE |
| 7 | MIYAGI |
| 8 | AKITA |
| 9 | YAMAGATA |
| 10 | FUKUSHIMA |
| 11 | IBARAKI |
| 12 | TOCHIGI |
| 13 | GUNMA |
| 14 | SAITAMA |
| 15 | CHIBA |
| 16 | TOKYO |
| 17 | IZU ISLANDS |
| 18 | OGASAWARA |
| 19 | KANAGAWA |
| 20 | NIIGATA |
| 21 | TOYAMA |
| 22 | ISHIKAWA |
| 23 | FUKUI |
| 24 | YAMANASHI |
| 25 | NAGANO |

| bit | Region Name |
|---|---|
| 26 | GIFU |
| 27 | SHIZUOKA |
| 28 | AICHI |
| 29 | MIE |
| 30 | SHIGA |
| 31 | KYOTO |
| 32 | OSAKA |
| 33 | HYOGO |
| 34 | NARA |
| 35 | WAKAYAMA |
| 36 | TOTTORI |
| 37 | SHIMANE |
| 38 | OKAYAMA |
| 39 | HIROSHIMA |
| 40 | YAMAGUCHI |
| 41 | TOKUSHIMA |
| 42 | KAGAWA |
| 43 | EHIME |
| 44 | KOCHI |
| 45 | FUKUOKA |
| 46 | SAGA |
| 47 | NAGASAKI |
| 48 | KUMAMOTO |
| 49 | OITA |
| 50 | MIYAZAKI |

| bit | Region Name |
|---|---|
| 51 | KAGOSHIMA |
| 52 | AMAMI (ISLANDS) |
| 53 | OKINAWA MAIN ISLAND |
| 54 | DAITOJIMA |
| 55 | MIYAKOJIMA |
| 56 | YAEYAMA |
| 57 | HOKKAIDO |
| 58 | TOHOKU |
| 59 | KANTO |
| 60 | IZU ISLANDS |
| 61 | OGASAWARA |
| 62 | HOKURIKU |
| 63 | KOSHIN |
| 64 | TOKAI |
| 65 | KINKI |
| 66 | CHUGOKU |
| 67 | SHIKOKU |
| 68 | KYUSHU |
| 69 | AMAMI (ISLANDS) |
| 70 | OKINAWA |
| 80 | EARTHQUAKE EARLY WARNINGS (WARNINGS) OF OTHER PREFECTURAL FORECAST REGIONS AND LOCAL FORECAST REGIONS |
| NN | EARTHQUAKE EARLY WARNINGS (WARNINGS) OF PREFECTURAL FORECAST REGIONS AND LOCAL FORECAST REGIONS (LOCATION: NN) |

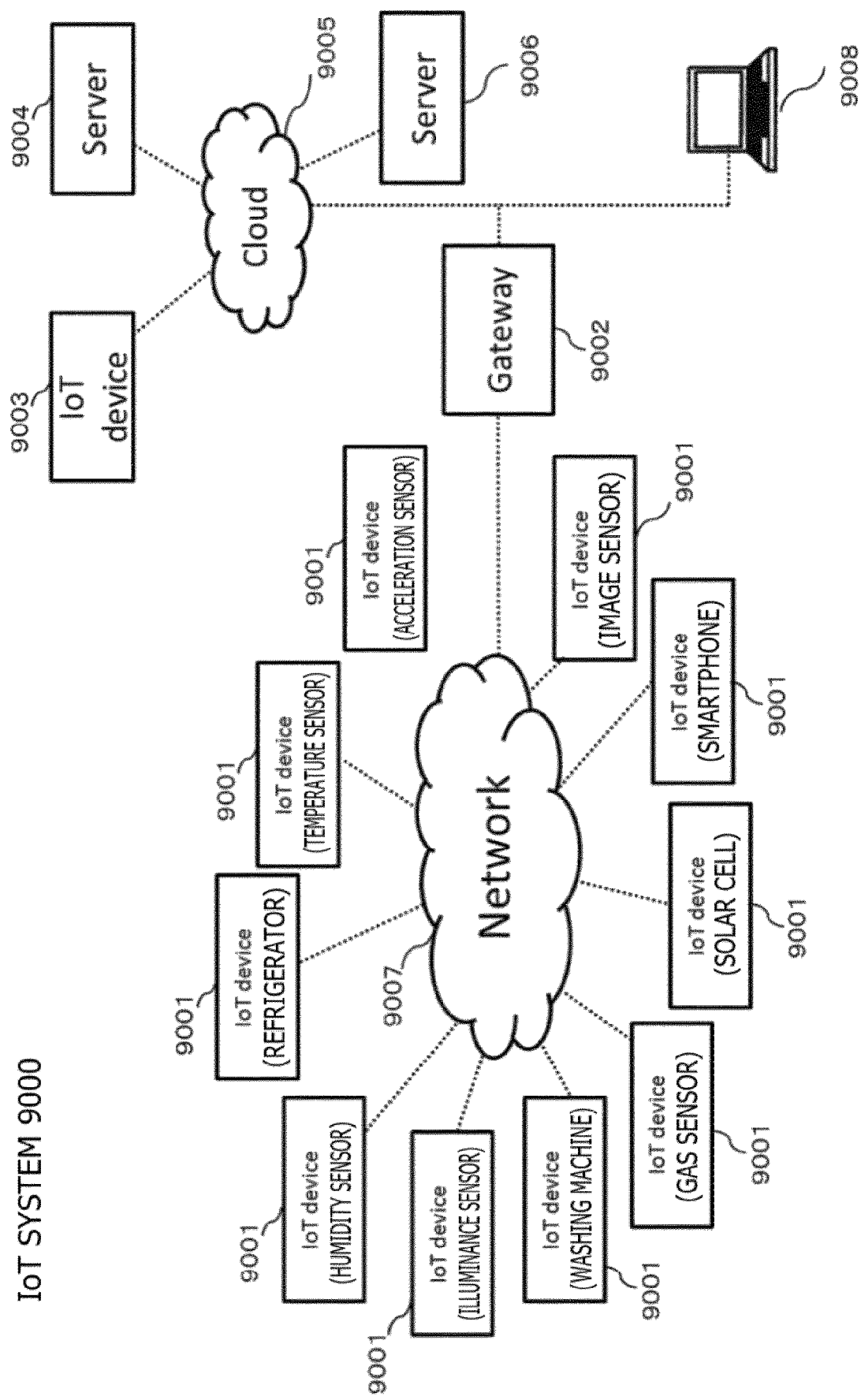

RECEIVER AND CONTROL METHOD OF THE SAME

TECHNICAL FIELD

The present technology relates to a receiver and a control method of the same and more particularly to a receiver for receiving a signal from a satellite and a control method of the same.

BACKGROUND ART

In the past, there has been in wide use a GNSS (Global Navigation Satellite System) that obtains a current position of a receiver by receiving signals from a plurality of satellites. Examples of GNSSes currently in service include a GPS (global Positioning System), a Galileo, and a QZSS (Quasi-Zenith Satellite System). In these GNSSes, a receiver requires to receive a signal from each of a plurality of, or four or more, satellites during positioning computations. For example, there has been proposed a receiver for simultaneously receiving signals L1 to L5, different in carrier frequency, from the plurality of respective satellites (refer, for example, to PTL 1).

CITATION LIST

Patent Literature

PTL 1

JP 2009-92473A

SUMMARY

Technical Problems

The above related art receives the signals L1 to L5, different in carrier frequency, from the plurality of respective satellites, thus providing improved noise immunity as compared to the case of reception of only the signal L1. However, while active, the receiver requires to continuously track the plurality of satellites and handle positioning computations, and the longer the receiver remains active, the more power the receiver consumes. Although halting the tracking and positioning computations provides reduced power consumption, the receiver is unable to acquire its current position, resulting in reduced convenience. As described above, the above receiver entails a difficulty in reducing power consumption.

The present technology has been devised in light of the foregoing circumstances, and it is an object of the present technology to reduce power consumption of a receiver that acquires its current position by using a signal from a satellite.

Solution to Problems

The present technology has been made to solve the above problems, and a first aspect thereof is a receiver and a control method thereof. The receiver includes a reception section that receives a signal from a predetermined satellite as a reception signal, a signal processing section that performs a process of determining whether or not the reception signal includes a specific message, and a positioning process section that performs a positioning process of acquiring a current position in a case where the reception signal includes the specific message. This provides an advantageous effect of performing a positioning process in the case where a reception signal includes a specific message.

Also, in this first aspect, the specific message may be a message that notifies information regarding at least a disaster or a crisis. This provides an advantageous effect of performing a positioning process in a case where a reception signal includes a message that notifies information regarding at least a disaster or a crisis.

Also, in this first aspect, the specific message may notify information regarding a disaster, and the positioning process section may perform the positioning process in a case where the reception signal includes the specific message and where the disaster has a predetermined value as a priority level. This provides an advantageous effect of performing a positioning process in the case where a reception signal includes a specific message and where a disaster has a predetermined value as a priority level.

Also, in this first aspect, the specific message may notify information regarding a disaster-hit location, and the positioning process section may output a warning on the basis of a positional relation between the disaster-hit location and the current position. This provides an advantageous effect of outputting a warning according to a positional relation between a disaster-hit location and a current position.

Also, in this first aspect, the positioning process section may output a warning on the basis of the positional relation and a transmission condition of the specific message. This provides an advantageous effect of outputting a warning according to a positional relation and a transmission condition.

Also, in this first aspect, there may further be provided a power supply control section that turns off a power for the positioning process section in a case where it is not determined that the reception signal includes the specific message and turns on the power for the positioning process section in a case where it is determined that the reception signal includes the specific message. This provides an advantageous effect of turning on the power for the measurement process section in the case where a reception signal includes a specific message.

Also, in this first aspect, the signal processing section may include a plurality of satellite processing units to which different satellites are assigned, individually, and the power supply control section may turn on, of the plurality of satellite processing units, the power for only a predetermined number of satellite processing units in the case where it is not determined that the reception signal includes the specific message and turn on, of the plurality of satellite processing units, the power for more satellite processing units than the predetermined number in the case where it is determined that the reception signal includes the specific message. This provides an advantageous effect of turning on the power for more satellite processing units than a predetermined number in the case where it is determined that a reception signal includes a specific message.

Also, in this first aspect, each of the plurality of satellite processing units includes a satellite capturing section that captures the assigned satellite, a satellite tracking section that tracks the captured satellite, a pseudo distance acquisition section that acquires time-of-day information from the reception signal and obtains a pseudo distance to the captured satellite on the basis of the time-of-day information, and a decoding section that decodes a signal from the satellite. The power supply control section may turn off a power for the pseudo distance acquisition section in the case where it is not determined that the reception signal includes the specific message. This provides an advantageous effect of turning off the power for a pseudo distance acquisition section in the case where a specific message is not included.

Also, in this first aspect, there may further be provided a power supply control section that activates an operating clock of the positioning process section in the case where it is not determined that the reception signal includes the specific message and deactivates the operating clock of the positioning process section in the case where it is determined that the reception signal includes the specific message. This provides an advantageous effect of performing control such that an operating clock of a measurement process section is activated in the case where a reception signal includes the specific message.

Also, in this first aspect, the signal processing section may include a plurality of satellite processing units to which different satellites are assigned, individually, and the power supply control section may activate, of the plurality of satellite processing units, operating clocks of only a predetermined number of satellite processing units in the case where it is not determined that the reception signal includes the specific message and activate, of the plurality of satellite processing units, operating clocks of more satellite processing units than the predetermined number in the case where it is determined that the reception signal includes the specific message. This provides an advantageous effect of performing control such that operating clocks of more satellite processing units than a predetermined number are activated in the case where a reception signal includes a specific message.

Also, in this first aspect, each of the plurality of satellite processing units includes a satellite capturing section that captures the assigned satellite, a satellite tracking section that tracks the captured satellite, a pseudo distance acquisition section that acquires time-of-day information from the reception signal and obtains a pseudo distance to the captured satellite on the basis of the time-of-day information, and a decoding section that decodes a signal from the satellite. The power supply control section may deactivate an operating clock of the pseudo distance acquisition section in the case where it is not determined that the reception signal includes the specific message. This provides an advantageous effect of performing control such that an operating clock of a pseudo distance acquisition section is deactivated in the case where a specific message is not included.

Also, in this first aspect, the signal processing section may monitor the reception signal from each of the plurality of satellites and determine whether or not any one of the reception signals includes the specific message. This provides an advantageous effect of monitoring a reception signal of each of a plurality of satellites.

Also, in this first aspect, the signal processing section can capture the satellite by using predetermined navigation data. This provides an advantageous effect of receiving a signal from a captured satellite by using navigation data.

Also, in this first aspect, the positioning process section may acquire the current position from a pseudo distance to each of a plurality of satellites and predetermined navigation data. This provides an advantageous effect of acquiring a current position from pseudo distances and navigation data in the case where a reception signal includes a specific message.

Also, in this first aspect, the reception section may receive a signal from a quasi-zenith satellite as the reception signal. This provides an advantageous effect of performing a positioning process in the case where a reception signal from a quasi-zenith satellite includes a specific message.

Advantageous Effect of Invention

According to the present technology, it is possible to achieve an excellent advantageous effect of providing reduced power consumption of a receiver that acquires its current position by using a signal from a satellite. It should be noted that the advantageous effect described herein is not necessarily limited and may be any one of the advantageous effects described in the present disclosure.

BRIEF DESCRIPTION OF DRAWINGS

FIG. 10 is a diagram illustrating a list of disaster categories in the first embodiment of the present technology.

FIG. 11 is a diagram illustrating examples of types of disasters with high priority levels in the first embodiment of the present technology.

FIG. 12 is a diagram illustrating examples of types of disasters with low priority levels in the first embodiment of the present technology.

FIG. 13 is a diagram illustrating examples of transmission conditions in the first embodiment of the present technology.

FIG. 14 is a diagram illustrating examples of notices regarding disaster prevention in the first embodiment of the present technology.

FIG. 15 is a diagram illustrating examples of forecast regions in the first embodiment of the present technology.

FIG. 22 is a diagram illustrating an example of a schematic configuration of an IoT system 9000 to which the technology according to an embodiment of the present disclosure is applicable.

DESCRIPTION OF EMBODIMENTS

Modes for carrying out the present technology (hereinafter referred to as embodiments) will be described below. The description will be given in the following order.

1. First embodiment (example in which a positioning process is performed when a specific message is received)
2. Second embodiment (example in which a plurality of satellites is captured and a positioning process is performed when a specific message is received)
3. Third embodiment (example in which a satellite is captured by using navigation data and a positioning process is performed when a specific message is received)
4. Application example

1. First Embodiment

Configuration Example of the Positioning System

Figure 1:
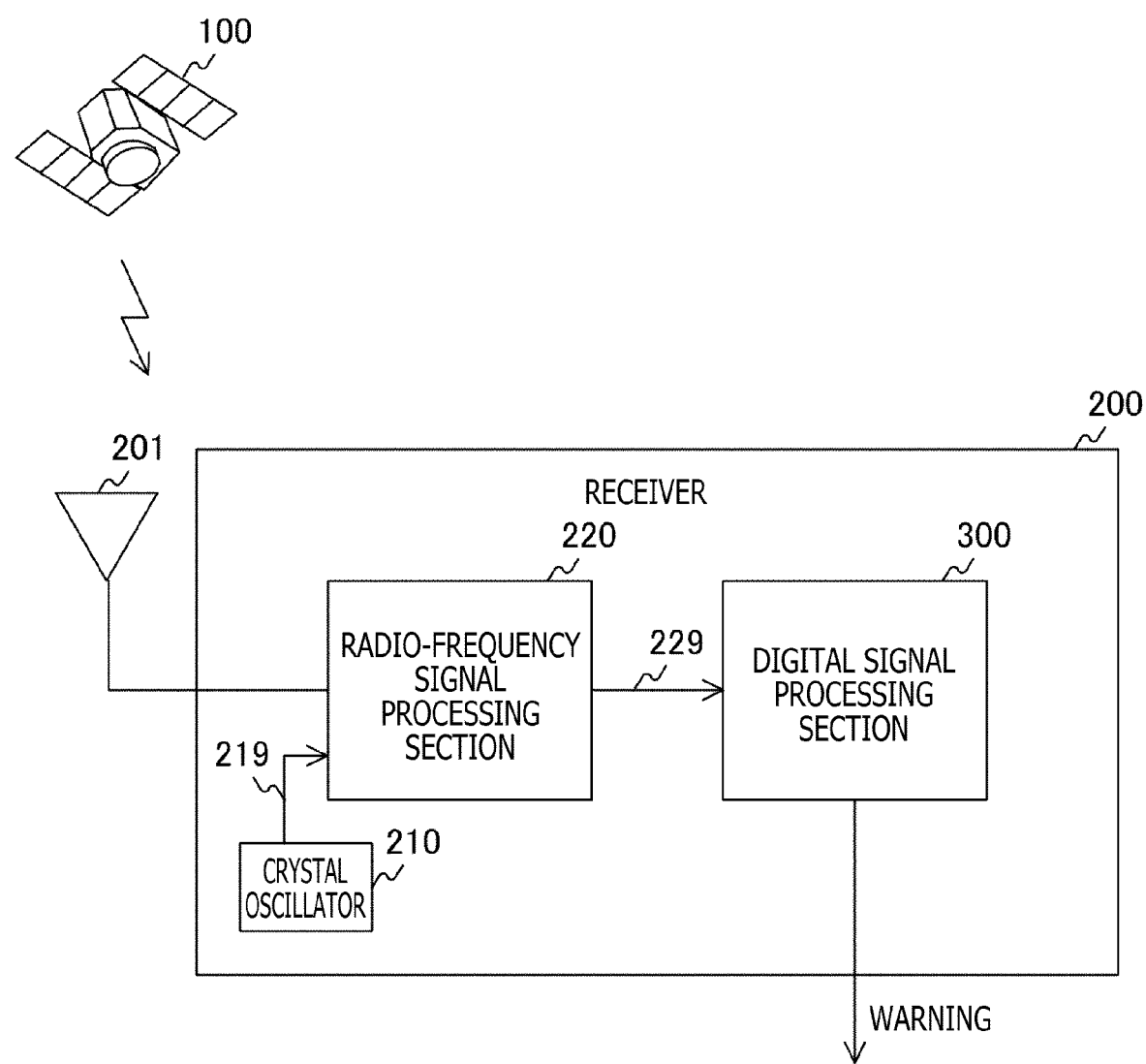
FIG. 1 is a general view illustrating a configuration example of a positioning system in a first embodiment of the present technology.

FIG. 1 is a general view illustrating a configuration example of a positioning system in a first embodiment of the present technology. This positioning system is designed to acquire its current position by using a signal from a satellite and includes a satellite 100 and a receiver 200. For example, a GPS satellite of the GPS or a quasi-zenith satellite of the QZSS is captured as the satellite 100. The number of satellites 100 to be captured varies depending on the status of the receiver 200.

The receiver 200 acquires its current position by receiving a satellite signal from the satellite 100. The receiver 200 includes an antenna 201, a crystal oscillator 210, a radio-frequency signal processing section 220, and a digital signal processing section 300.

The antenna 201 converts electromagnetic waves sent from the satellite into an electric signal. This electric signal includes an analog radio-frequency signal used for wireless communication. The antenna 201 supplies the radio-frequency signal to the radio-frequency signal processing section 220.

The crystal oscillator 210 generates a clock signal having a constant frequency by capitalizing on a crystal's piezoelectric phenomenon. The crystal oscillator 210 supplies the generated clock signal to the radio-frequency signal processing section 220.

The radio-frequency signal processing section 220 amplifies the radio-frequency signal, converting the signal into a digital signal in synchronism with the clock signal. The radio-frequency signal processing section 220 supplies the converted digital signal to the digital signal processing section 300.

The digital signal processing section 300 processes the digital signal and performs a positioning process of acquiring a current position in the case where a specific message is included in the digital signal. As a specific message that initiates the positioning process, for example, a disaster/crisis notification message that notifies disaster and crisis management information (hereinafter referred to as "disaster/crisis information") regarding at least a disaster or a crisis is used. Examples of disasters include earthquakes, volcanic eruptions, and tsunamis. Examples of crises include terrorisms and armed attack situations.

Configuration Example of the Radio-Frequency Signal Processing Section

Figure 2:
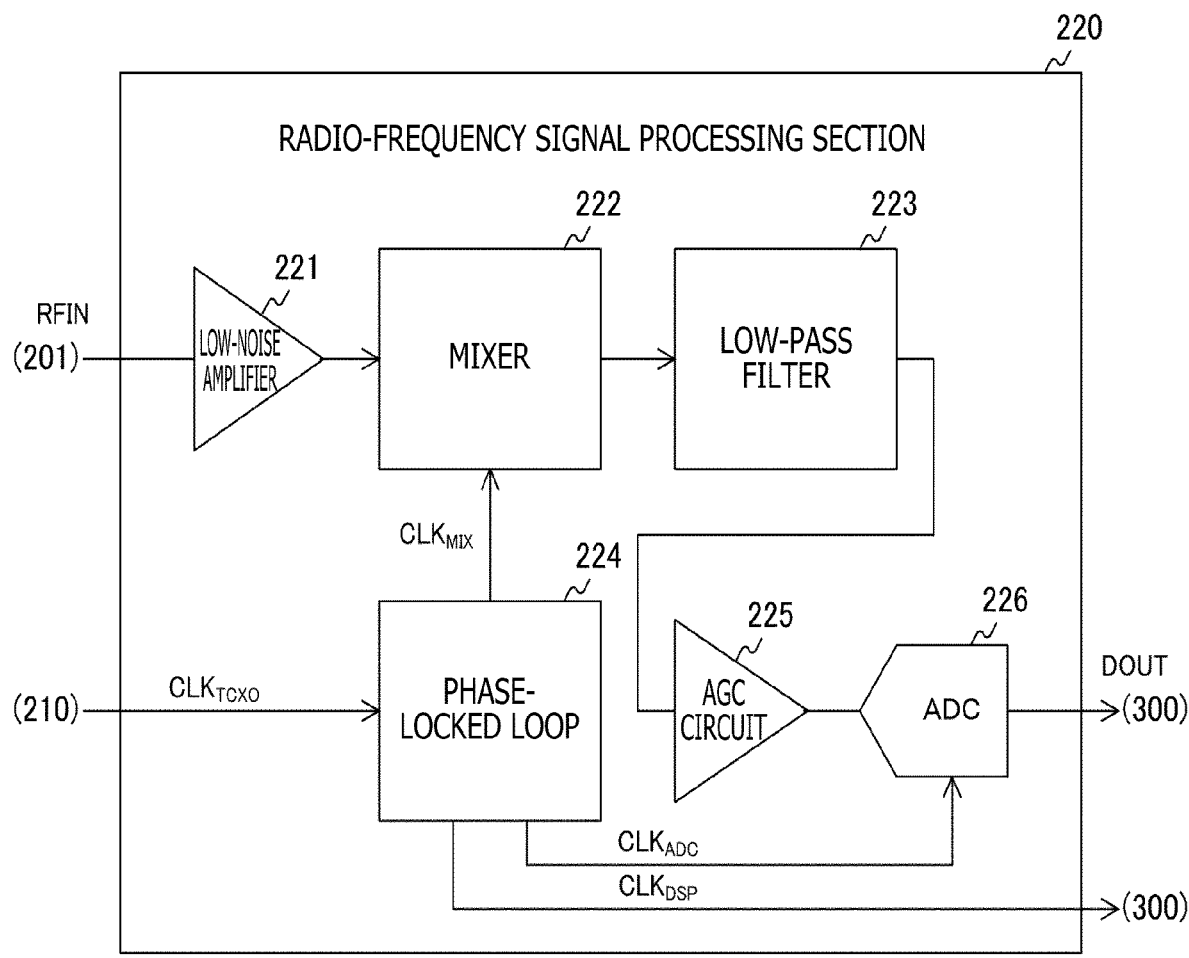
FIG. 2 is a block diagram illustrating a configuration example of a radio-frequency signal processing section in the first embodiment of the present technology.

FIG. 2 is a block diagram illustrating a configuration example of the radio-frequency signal processing section 220 in the first embodiment of the present technology. The radio-frequency signal processing section 220 includes a low-noise amplifier 221, a mixer 222, a low-pass filter 223, and a phase-locked loop 224. Also, the radio-frequency signal processing section 220 includes an AGC (Auto Gain Control) circuit 225 and an ADC (Analog to Digital Converter) 226.

The low-noise amplifier 221 amplifies a radio-frequency signal RFIN from the antenna 201. The low-noise amplifier 221 supplies the amplified radio-frequency signal RFIN to the mixer 222.

The phase-locked loop 224 multiplies a clock signal $CLK_{TCXO}$ from the crystal oscillator 210. The phase-locked loop 224 generates clock signals $CLK_{MIX}$, $CLK_{ADC}$, and $CLK_{DSP}$ through multiplication. Then, the phase-locked loop 224 supplies the clock signal $CLK_{MIX}$ to the mixer 222, the clock signal $CLK_{ADC}$ to the ADC 226, and the clock signal $CLK_{DSP}$ to the digital signal processing section 300.

The mixer 222 down-converts the frequency of a radio-frequency signal to a lower first intermediate frequency by mixing the radio-frequency signal RFIN with a local signal. The mixer 222 supplies the post-mixing first intermediate frequency signal to the low-pass filter 223.

The low-pass filter 223 passes frequency components of the first intermediate frequency signal at or below a predetermined cutoff frequency and supplies these frequency components to the AGC circuit 225.

The AGC circuit 225 controls a gain of the input first intermediate frequency signal according to the level thereof and outputs the first intermediate frequency signal at a certain level to the ADC 226.

The ADC 226 converts the first intermediate frequency signal from the AGC circuit 225 into a digital signal DOUT and supplies the digital signal DOUT to the digital signal processing section 300.

Configuration Example of the Digital Signal Processing Section

Figure 3:
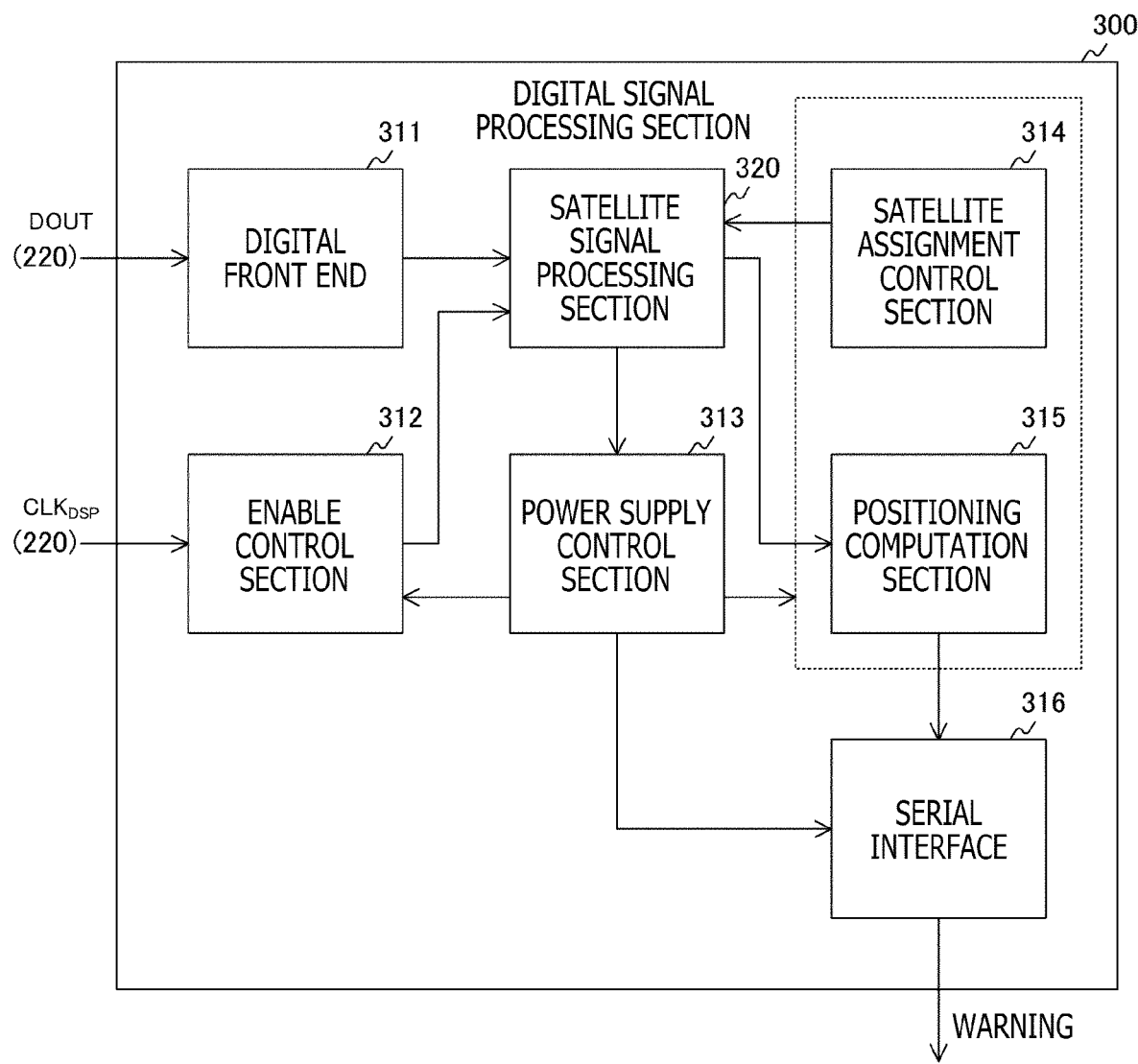
FIG. 3 is a block diagram illustrating a configuration example of a digital signal processing section in the first embodiment of the present technology.

FIG. 3 is a block diagram illustrating a configuration example of the digital signal processing section 300 in the first embodiment of the present technology. The digital signal processing section 300 includes a digital front end 311, an enable control section 312, a satellite signal processing section 320, a power supply control section 313, a satellite assignment control section 314, a positioning computation section 315, and a serial interface 316.

The digital front end 311 handles a process of reducing the frequency of the digital signal DOUT having the first intermediate frequency from the radio-frequency signal processing section 220 to a second intermediate frequency by passing the signal through a digital filter and the like. The digital front end 311 supplies the digital signal having the second intermediate frequency to the satellite signal processing section 320 as a baseband signal. This allows a baseband signal to be received. It should be noted that the baseband signal is an example of the reception signal described in the claims and that the digital front end 311 is an example of the reception section described in the claims.

The enable control section 312 activates or deactivates the satellite signal processing section 320 under control of the power supply control section 313.

The satellite signal processing section 320 performs a process of determining whether or not the baseband signal (i.e., reception signal) from the digital front end 311 includes a specific message. The specific message is, for example, a disaster/crisis notification message.

The satellite signal processing section 320 monitors the baseband signal, extracting, in the case where a disaster/crisis notification message is included, the disaster/crisis information and supplying the information to the power supply control section 313 and the positioning computation section 315. Also, the satellite signal processing section 320 acquires information used for positioning computations (for example, navigation data, a pseudo distance, and reinforcement data) and supplies such information to the positioning computation section 315. Here, navigation data is ephemeris data and almanac data. Reinforcement data is, for example, data for submeter-class positioning. It should be noted that the satellite signal processing section 320 is an example of the signal processing section described in the claims.

The power supply control section 313 performs control such that the power for the satellite signal processing section 320, the satellite assignment control section 314, the positioning computation section 315, and the serial interface 316 is turned on according to the status of the receiver 200. Supply of power to the satellite signal processing section 320 is controlled via the enable control section 312.

Here, the statuses of the receiver 200 are classified into power saving mode, positioning mode, and warning output mode. In power saving mode, the receiver 200 consumes less power than in positioning mode and warning output mode as a result of deactivation of a positioning function of the receiver 200. Also, in positioning mode, the receiver 200 acquires its current position through positioning computations. In warning output mode, the receiver 200 outputs a warning on the basis of its current position and disaster/crisis information.

In its initial status, the receiver 200 is set, for example, to power saving mode. In the power saving mode, the power supply control section 313 controls the enable control section 312 to turn off the power for some units and circuits in the satellite signal processing section 320. Also, the power supply control section 313 turns off the power for the satellite assignment control section 314, the positioning computation section 315, and the serial interface 316. This provides reduced power consumption. It should be noted that the power supply control section 312 may activate or deactivate the operating clock of the positioning computation section 314 instead of turning on or off the power for the positioning computation section 314.

Then, in the case where disaster/crisis information is acquired, the receiver 200 moves from power saving mode to positioning mode. In this case, the power supply control section 313 turns on the power for the satellite signal processing section 320, the satellite assignment control section 314, the positioning computation section 315, and the serial interface 316.

The satellite assignment control section 314 decides satellites to be captured and assigns the satellites to a plurality of units in the satellite signal processing section 320. The satellite assignment control section 314 decides which startup status, cold start, warm start, or hot start, to move to after the power is turned on.

Here, cold start is a startup status with no valid backup data such as at the time of factory shipment. Warm start is a startup status with invalid ephemeris data, albeit with a valid time of day. Hot start is a startup status with a valid time of day and ephemeris data backed up.

Then, the satellite assignment control section 314 decides satellites to be captured on the basis of the startup status. This course of decision includes a point of view holding, for example, that, in the presence of ephemeris data, a capturing rate is higher than usual because it is possible to calculate satellites' Doppler frequencies from the receiver's time of day. Also, this course of decision includes a determination holding that, in the case where almanac data is already available, the positions and Doppler frequencies of all the satellites are known, and therefore, those satellites having high elevation angles will be targeted because such satellites hold promise for excellent reception conditions.

The satellite assignment control section 314 assigns the satellites decided to the plurality of units in the satellite signal processing section 320, individually and supplies identification information of the assigned satellites to these units. C/A (Coarse/Acquisition) code is, for example, used as identification information. In power saving mode, the satellite assignment control section 314 assigns a predetermined number of quasi-zenith satellites (for example, one satellite). Meanwhile, in positioning mode, the satellite assignment control section 314 assigns more satellites than in power saving mode and as many satellites as required to carry out positioning computations. Positioning computations require four or more satellites, and eight or more satellites are desirable to achieve more stable positioning accuracy.

The positioning computation section 315 performs a positioning process of acquiring a current position in the case where disaster/crisis information is acquired. The positioning computation section 315 performs positioning computations for acquiring the current position from the pseudo distance to each of the plurality of satellites and navigation data. If positioning is successful, the positioning computation section 315 determines whether or not to output a warning on the basis of contents of disaster/crisis information. The receiver 200 moves to warning output mode when a predetermined condition for outputting a warning is satisfied as in the case of a serious disaster. Then, the positioning computation section 315 outputs a warning to outside the receiver 200 via the serial interface 316. It should be noted that the positioning computation section 315 is an example of the positioning process section described in the claims.

Functions of the satellite assignment control section 314 and the positioning computation section 315 are realized as a result of execution of a predetermined program by a CPU (Central Processing Unit).

It should be noted that although the positioning computation section 315 acquires the current position from the pseudo distance to each of the plurality of satellites and navigation data, the present technology is not limited to this configuration. For example, the receiver 200 can further include a communication circuit for receiving information indicating an access point position so that the access point position is acquired as the current position. A base station, a Wi-Fi (registered trademark) router, or the like is possible for use as an access point. In the case where an access point position is acquired, it is no longer necessary to turn on the power for four or more satellite processing units 330.

Configuration Example of the Satellite Signal Processing Section

Figure 4:
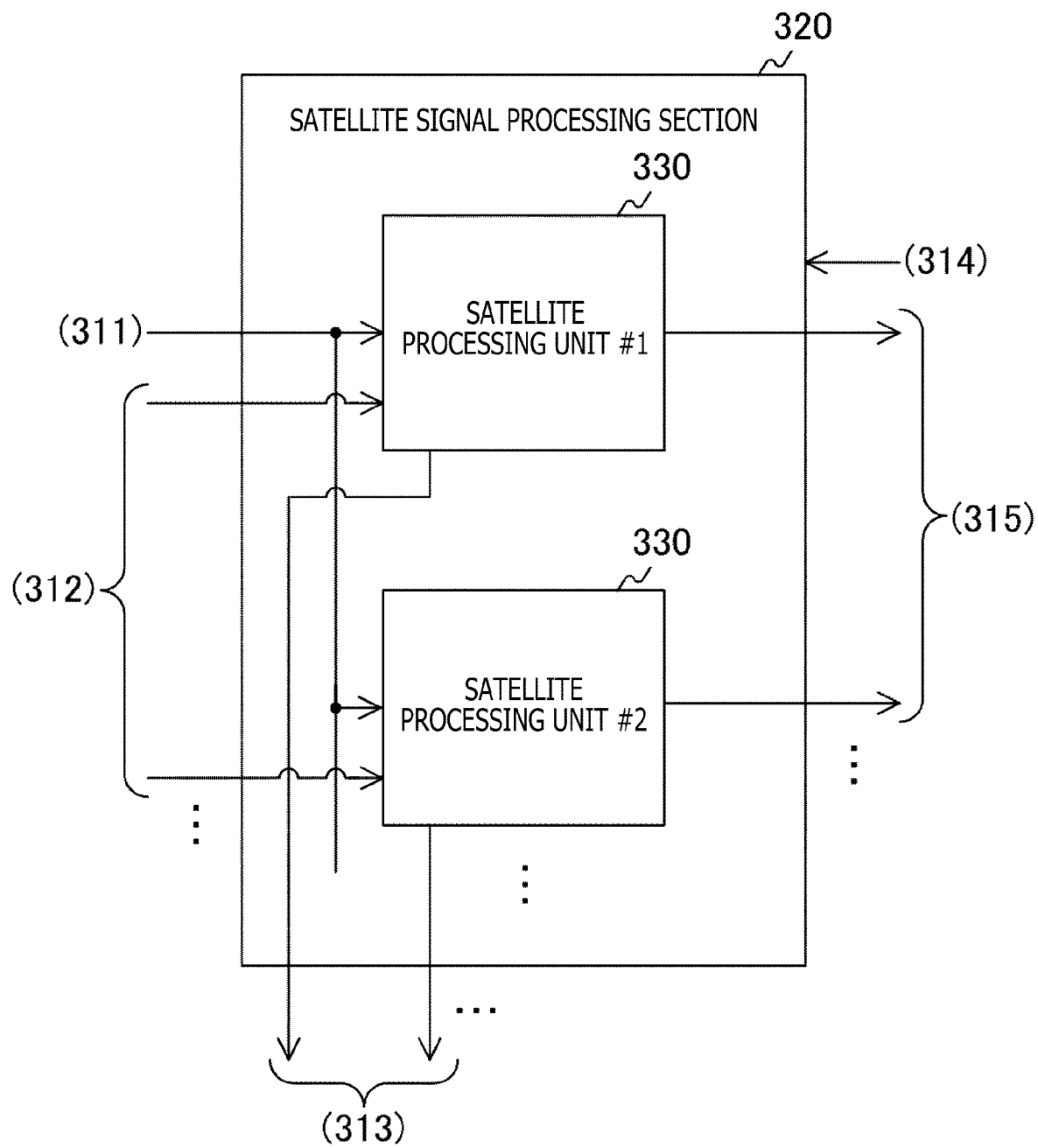
FIG. 4 is a block diagram illustrating a configuration example of a satellite signal processing section in the first embodiment of the present technology.

FIG. 4 is a block diagram illustrating a configuration example of the satellite signal processing section 320 in the first embodiment of the present technology. The satellite signal processing section 320 has the plurality of satellite processing units 330. The satellite processing units 330 are assigned different satellites, individually, by the satellite assignment control section 314 as satellites to be captured.

The satellite processing unit 330 processes a signal from the assigned satellite. The satellite processing unit 330 receives a baseband signal from the digital front end 311. The satellite processing unit 330 extracts a signal of the assigned satellite from the baseband signal and decodes the extracted signal. In power saving mode, the satellite processing unit 330 determines, by decoding, whether or not a disaster/crisis notification message has been acquired as a specific message. In the case where a disaster/crisis notification message has been acquired, the satellite processing unit 330 extracts disaster/crisis information from the message and supplies the information to the power supply control section 313 and the positioning computation section 315. Then, the satellite signal processing section 320 moves to positioning mode at the time of acquisition of disaster/crisis information, acquires navigation data and reinforcement data, and supplies these pieces of data to the positioning computation section 315.

Also, the enable control section 312 turns on or off the power for each of the satellite processing units 330 under control of the power supply control section 313. It should be noted that the enable control section 312 may activate or deactivate the operating clock of each of the satellite processing units 330 instead of turning on or off the power for each of the satellite processing units 330.

Configuration Example of the Satellite Processing Unit

Figure 5:
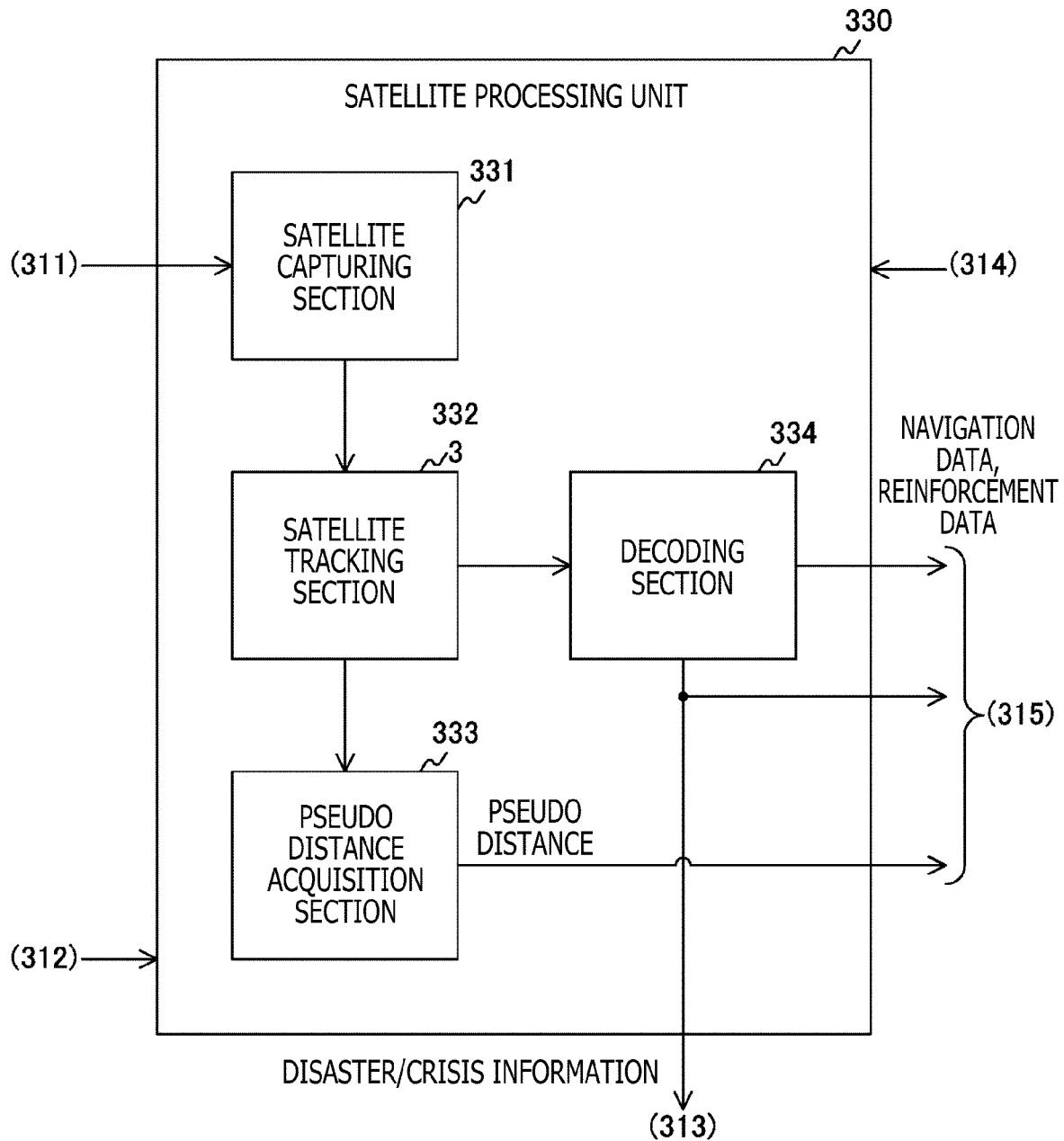
FIG. 5 is a block diagram illustrating a configuration example of a satellite processing unit in the first embodiment of the present technology.

FIG. 5 is a block diagram illustrating a configuration example of the satellite processing unit 330 in the first embodiment of the present technology. The satellite processing unit 330 includes a satellite capturing section 331, a satellite tracking section 332, a pseudo distance acquisition section 333, and a decoding section 334.

The satellite capturing section 331 captures an assigned satellite. The satellite capturing section 331 acquires a correlation value, for example, by feeding an exclusive logical sum of identification information (C/A code) of the assigned satellite and the input baseband signal to a correlator. The satellite capturing section 331 monitors the correlation value at certain intervals and outputs a carrier frequency offset and a code phase that provide the maximum correlation value to the satellite tracking section 332 as capture results.

The satellite tracking section 332 tracks the captured satellite. The satellite tracking section 332 uses a carrier frequency offset and a code phase as an initial value and synchronizes with a carrier and a code timing and further synchronizes with physical frames of navigation data and reinforcement data, thus reproducing a satellite transmission time of day. The satellite tracking section 332 supplies time-of-day information indicating the transmission time of day to the pseudo distance acquisition section 333. Also, the satellite tracking section 332 feeds a demodulated signal, synchronous with a physical frame, to the decoding section 334.

The pseudo distance acquisition section 333 acquires a pseudo distance. The pseudo distance acquisition section 333 estimates a satellite signal propagation time from a difference between a transmission time of day and a reception time of day of the receiver 200 and estimates a propagation distance between the satellite 100 and the receiver 200 by multiplying the transmission time by the speed of light. This estimated propagation distance is referred to as a pseudo distance as it includes, as compared to an actual geometrical distance, satellite clock and satellite orbit errors and errors attributable to ionosphere, troposphere, multipath, and other delays. The pseudo distance acquisition section 333 supplies the acquired pseudo distance to the positioning computation section 315.

The decoding section 334 decodes a demodulated signal from the captured satellite. The decoding section 334 determines, by decoding, whether or not a disaster/crisis notification message has been acquired. In the case where a disaster/crisis notification message has been acquired, the decoding section 334 extracts disaster/crisis information from the message and supplies the information to the power supply control section 313 and the positioning computation section 315. Then, the decoding section 334 moves to positioning mode at the time of acquisition of disaster/crisis information, acquires navigation data and reinforcement data, and supplies these pieces of data to the positioning computation section 315.

Figure 6:
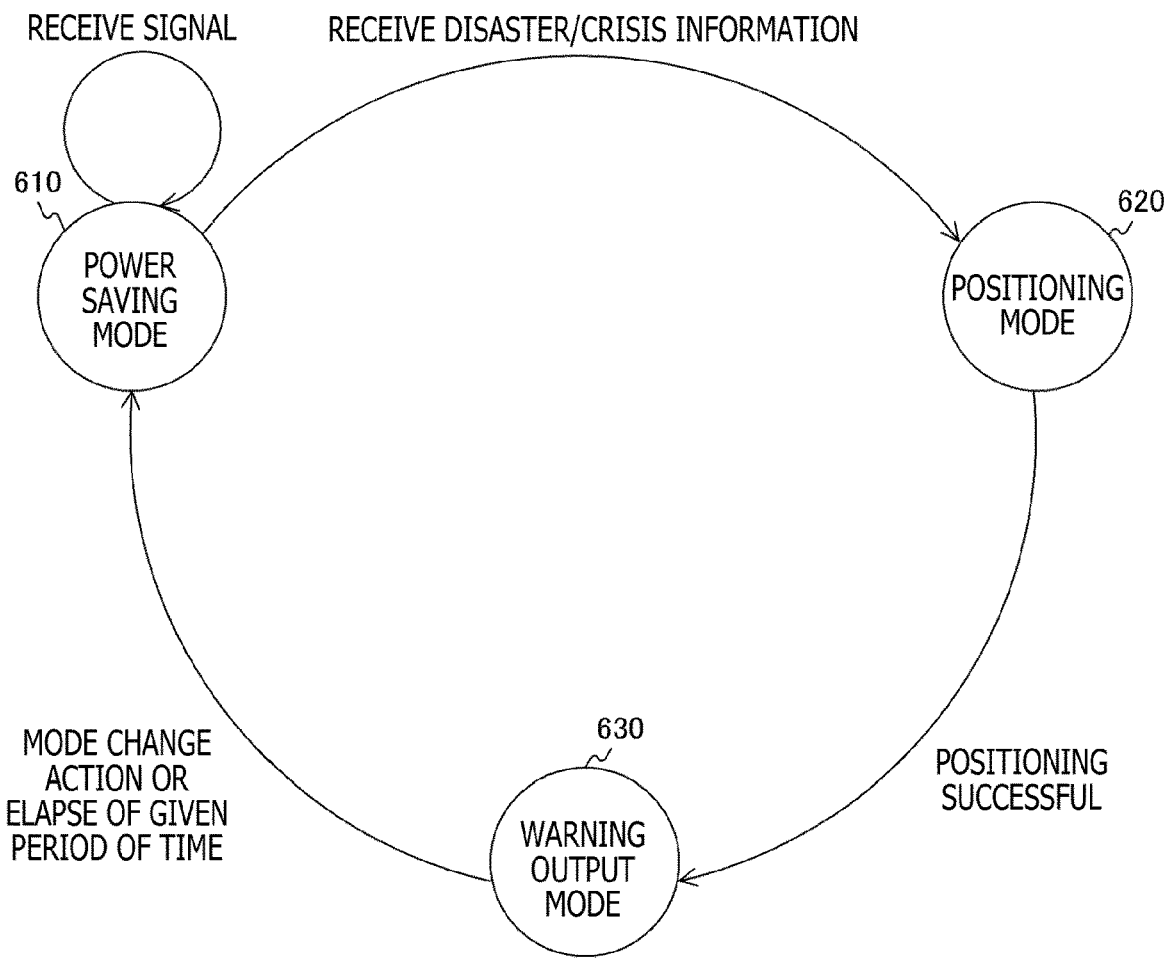
FIG. 6 is an example of a state transition diagram of a receiver in the first embodiment of the present technology.

FIG. 6 is an example of a state transition diagram of the receiver 200 in the first embodiment of the present technology. In its initial status, the receiver 200 moves, for example, to power saving mode 610. In the power saving mode 610, the receiver 200 regularly receives a signal from the satellite.

Then, the receiver 200 moves to positioning mode 620 at the time of reception of a specific message including disaster/crisis information and performs positioning computations. In the case where positioning is successful, the receiver 200 moves to warning output mode 630 and outputs a warning as necessary.

In the case where a predetermined action is performed to change the mode or a certain amount of time or more elapses with no action in the warning output mode 630, the receiver 200 moves to the power saving mode 610. As described above, the receiver 200 does not perform positioning computations unless disaster/crisis information is received, making it possible to provide reduced power consumption than in the case where positioning computations are performed irrespective of the presence or absence of disaster/crisis information.

Figure 7:
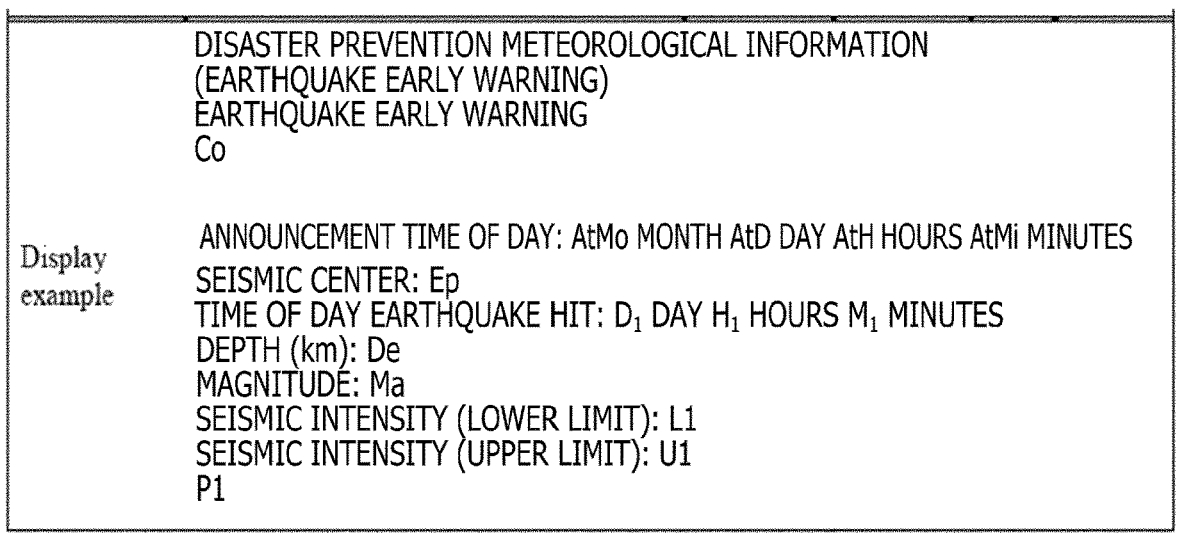
FIG. 7 is a diagram illustrating an example of outputting a warning in the first embodiment of the present technology.

FIG. 7 is a diagram illustrating an example of outputting a warning in the first embodiment of the present technology. In the case where disaster/crisis information includes information regarding an earthquake, for example, display data indicating a title named, "Disaster Prevention Meteorological Information (Earthquake Early Warning)," the time of day when the earthquake hit, the seismic center, the magnitude, the depth, and the like is output. This display data is output to a display section of the receiver 200 or an external display apparatus, and details of the data are displayed.

Figures 8, 9:
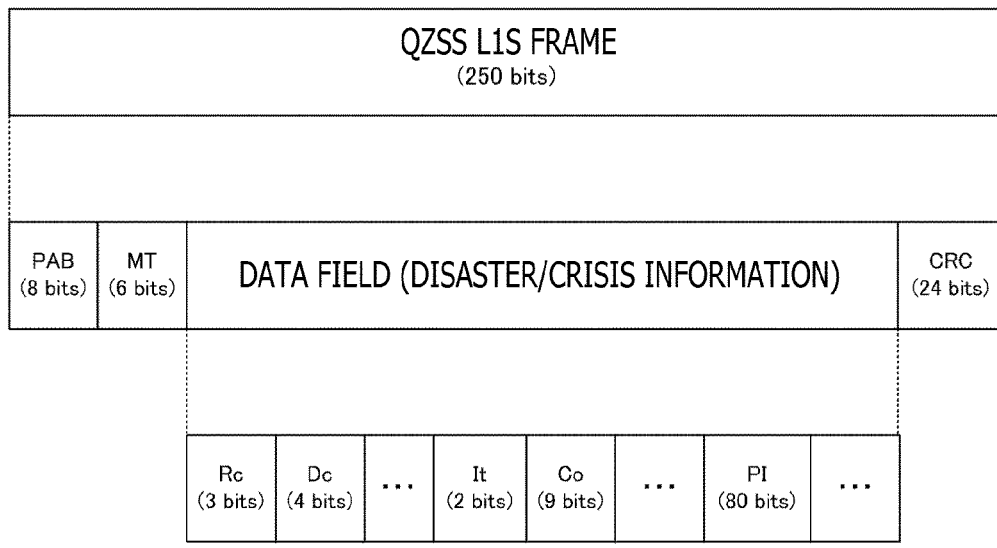
FIG. 8 is a diagram illustrating an example of a data structure of an L1S frame in the first embodiment of the present technology.
FIG. 9 is a diagram illustrating an example of a message type in the first embodiment of the present technology.

FIG. 8 is a diagram illustrating an example of a data structure of an L1S frame in the first embodiment of the present technology. A satellite signal (reception signal) from a quasi-zenith satellite includes an L1S frame. A frame such as the L1S frame is referred to as a message. An L1S frame (message) is 250 bits long and includes an eight-bit preamble PAB, a six-bit message type MT, a data field that stores disaster/crisis information and the like, and a cyclic redundancy check code CRC. For example, disaster/crisis information for earthquake early warning includes a report classification Rc, a disaster category Dc, an information type It, a disaster prevention notice Co, and a forecast region PI. It should be noted that although disaster/crisis information is acquired from an L1S frame, the receiver 200 may acquire disaster/crisis information from an L5S frame in QZSS instead of an L1S frame.

The satellite tracking section 332 detects a beginning of the frame by achieving frame synchronization with the preamble PAB. The preamble is a series known to the receiver side, thus allowing the satellite tracking section 332 to detect the preamble, for example, by acquiring a correlation value. When the frame synchronization is complete, the decoding section 334 can extract the message type MT, the data field, and the cyclic redundancy check code CRC.

FIG. 9 is a diagram illustrating an example of the message type MT in the first embodiment of the present technology. In the case where the message type MT is "43," disaster prevention information of JMA (Japan Meteorological Agency) is stored as disaster/crisis information. Also, in the case where the message type MT is "44," disaster prevention information of other organization is stored.

The decoding section 334 carries out cyclic redundancy check by using the cyclic redundancy check code CRC and analyzes contents of the message type MT and the data field in the absence of error. For example, in the case where the message type MT is "43" or "44," the decoding section 334 supplies disaster/crisis information in the data field to the power supply control section 313 and the positioning computation section 315, and the receiver 200 moves to positioning mode.

FIG. 10 is a diagram illustrating a list of the disaster categories Dc in the first embodiment of the present technology. For example, in the case where the disaster category Dc is "1," this indicates "Earthquake Early Warning." In the case where the disaster category Dc is "2," this indicates "Seismic Center." In the case where the disaster category Dc is "3," this indicates "Seismic Intensity." In the case where the disaster category Dc is "4," this indicates "Tokai Earthquake."

FIG. 11 is a diagram illustrating examples of types of disasters with high priority levels in the first embodiment of the present technology. The disaster categories illustrated in FIG. 10 have priority levels set according to urgency or gravity as illustrated in FIG. 11. For example, in the case where the disaster type indicated in the disaster category is "Earthquake Early Warning" or "Tsunami" in a tsunami warning condition, "Maximum priority" is assigned as a priority level. Also, in the case where the disaster type indicated by the disaster category is "Seismic Center," "Seismic Intensity," or "Tokai Earthquake" in a temporary condition, "Priority" is assigned as a priority level.

It should be noted that the receiver 200 moves to positioning mode in the case where the message type MT is "43" or "44." However, the present technology is not limited to this configuration. For example, in the case where the message type MT is "43" or "44" and where a predetermined priority level ("Maximum priority" or "Priority") is assigned as a disaster priority level, the receiver 200 may move to positioning mode.

FIG. 12 is a diagram illustrating examples of types of disasters with low priority levels in the first embodiment of the present technology. For example, in the case where the disaster type indicated by the disaster category is "Tokai Earthquake" in an end condition or "Tsunami" in a warning-lifted condition, "Regular" is assigned as a priority level.

FIG. 13 is a diagram illustrating examples of transmission conditions in the first embodiment of the present technology. Message transmission conditions are classified into Start, Update, and End. The condition for transition to each condition varies depending on the disaster/crisis information type. For example, in the case of disaster/crisis information in "Earthquake Early Warning," the "Start" condition is assumed as a transmission condition in the case where the information type It indicates "In effect." Also, when disaster/crisis information changes, the "Update" condition is assumed as a transmission condition. If five minutes elapse after the information type It indicates "In effect" or "Lifted," the "End" condition is assumed as a transmission condition.

FIG. 14 is a diagram illustrating examples of the notices Co regarding disaster prevention in the first embodiment of the present technology. For example, in the case where the notice Co is "101," information, "Slight sea-level changes may be observed in coastal regions," is notified. In the case where the notice Co is "102," information, "Slight sea-level changes may be observed in coastal regions, but no tsunami damage is expected," is notified. The contents of the notices illustrated in FIG. 14 are embedded, for example, in the display data illustrated in FIG. 7.

FIG. 15 is a diagram illustrating examples of the forecast regions PI in the first embodiment of the present technology. The forecast region PI is information regarding a disaster-hit location. For example, in the case where the forecast region PI is "1," this indicates the "Central Hokkaido" region. In the case where the forecast region PI is "2," this indicates the "Southern Hokkaido" region.

The positioning computation section 315 determines whether or not to output a warning on the basis of the transmission condition illustrated in FIG. 13 or the forecast region PI illustrated in FIG. 15. For example, in the case where the transmission condition is "End," the positioning computation section 315 outputs no warning. Meanwhile, in the case where the transmission condition is "Start" or "Update," the positioning computation section 315 determines whether or not to output a warning on the basis of a positional relation between the forecast region PI (disaster-hit location) and the current position. For example, the positioning computation section 315 outputs a warning in the case where the current position falls within the forecast region or where the distance from a border of the region to the current position is equal to or less than a given distance and otherwise does not output any warning.

It should be noted that the positioning computation section 315 can output a warning including the forecast region PI irrespective of the current position. Also, the positioning computation section 315 may not output a warning in the case of a low gravity as when the seismic intensity or magnitude is low even in the case where the current position falls within the forecast region or where the distance from the region's border to the current position is equal to or less than the given distance.

Information illustrated in FIGS. 7 to 15 is given in "'Quasi-Zenith Satellite System Interface Specification DC Report Service (IS-QZSS-DCR-002),' [online] Cabinet Office and Quasi-Zenith Satellite System Services Inc., Internet (http://qzss.go.jp/technical/download/is_qzss_dcr_002_agr ee.html)."

Figure 16:
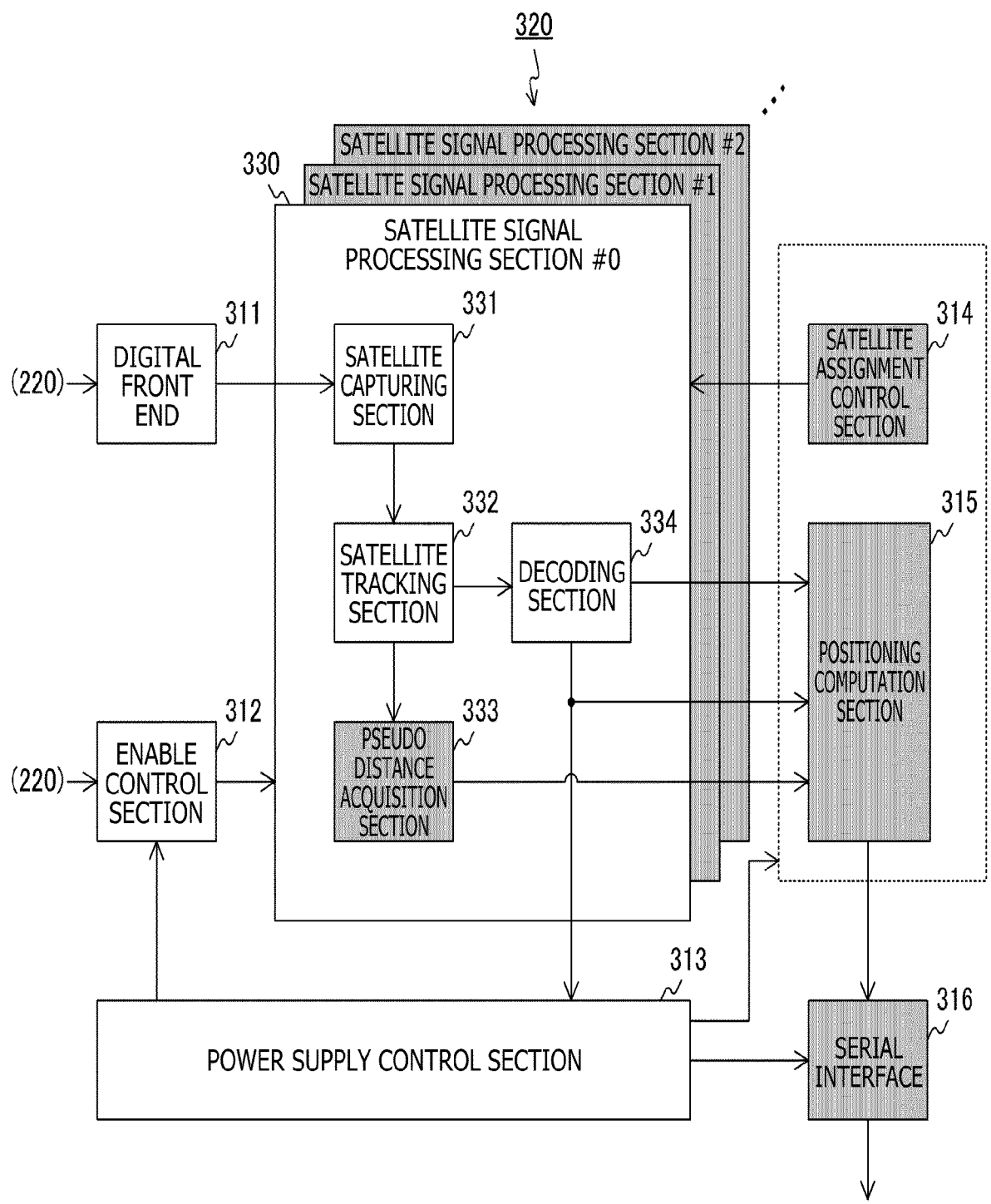
FIG. 16 is a diagram illustrating an example of a receiver in power saving mode in the first embodiment of the present technology.

FIG. 16 is a diagram illustrating an example of the receiver 200 in power saving mode in the first embodiment of the present technology. In FIG. 16, gray areas represent those where the power has been turned off. In power saving mode, the power is turned on for only one of the plurality of satellite processing units 330, with the power left off for the remaining satellite processing units 330. In the satellite processing unit 330 for which the power has been turned on, the power is turned on only for the satellite capturing section 331, the satellite tracking section 332, and the decoding section 334, with the power left off for the pseudo distance acquisition section 333. The power is left off for the remaining satellite processing units 330. The power is turned on for only one of the satellite processing units 330 because it is only necessary to monitor a satellite signal from a single quasi-zenith satellite so as to receive disaster/crisis information. It should be noted that the enable control section 312 may activate or deactivate the operating clock for each of the satellite capturing section 331, the satellite tracking section 332, the pseudo distance acquisition section 33, and the decoding section 334 of the remaining satellite processing units 330 instead of turning on or off the power for these sections.

Also, the power for the digital front end 311, the enable control section 312, and the power supply control section 313 is turned on whereas the power for the satellite assignment control section 314, the positioning computation section 315, and the serial interface 316 is left off.

The satellite processing unit 330 for which the power has been turned on regularly monitors a reception signal from the quasi-zenith satellite and determines whether or not a disaster/crisis notification message is included.

Positioning computations handled by the positioning computation section 315 involve a large processing volume, resulting in an extremely high power consumption of the receiver 200. In particular, in the case where the receiver is a piece of mobile equipment that runs on battery power, the receiver can remain operational for a shorter period of time, giving rise to a strong demand for reduced power consumption. Accordingly, the receiver 200 halts its positioning computations until disaster/crisis information is acquired. It should be noted that the receiver 200 receives and decodes a reception signal on a regular basis to acquire disaster/crisis information.

Figure 17:
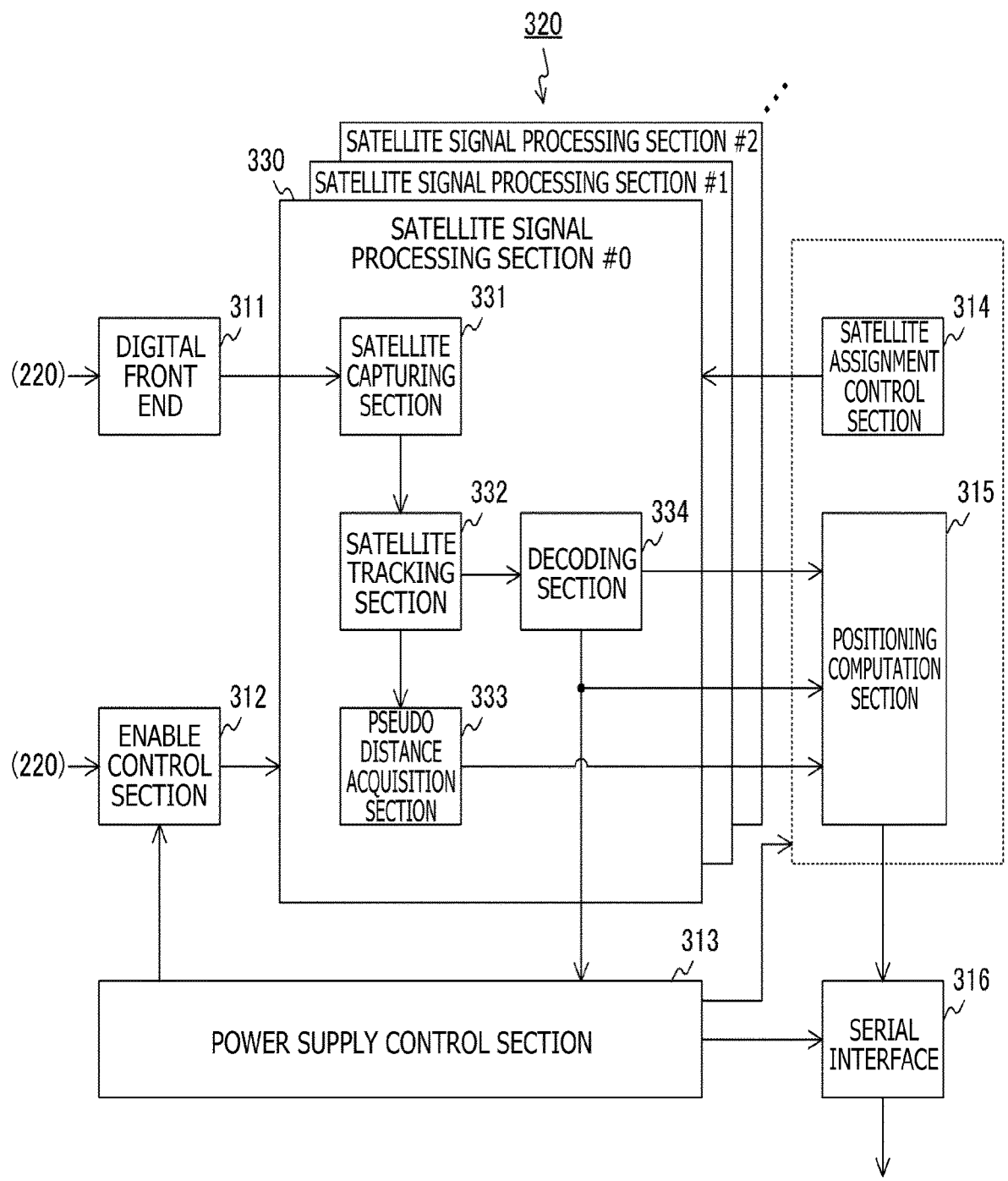
FIG. 17 is a diagram illustrating an example of the receiver in positioning mode in the first embodiment of the present technology.

FIG. 17 is a diagram illustrating an example of the receiver 200 in positioning mode in the first embodiment of the present technology. When disaster/crisis information is acquired, the receiver 200 moves to positioning mode, thus handling positioning computations. In this positioning mode, the power is turned on for four or more satellite processing units 330. Also, the power is turned on for the satellite assignment control section 314, the positioning computation section 315, and the serial interface 316.

As described above, it is possible, by performing positioning computations in the case of acquisition of disaster/crisis information, to provide reduced power consumption as compared to performing positional computations irrespective of the presence or absence of disaster/crisis information.

Operation Example of the Receiver

Figure 18:
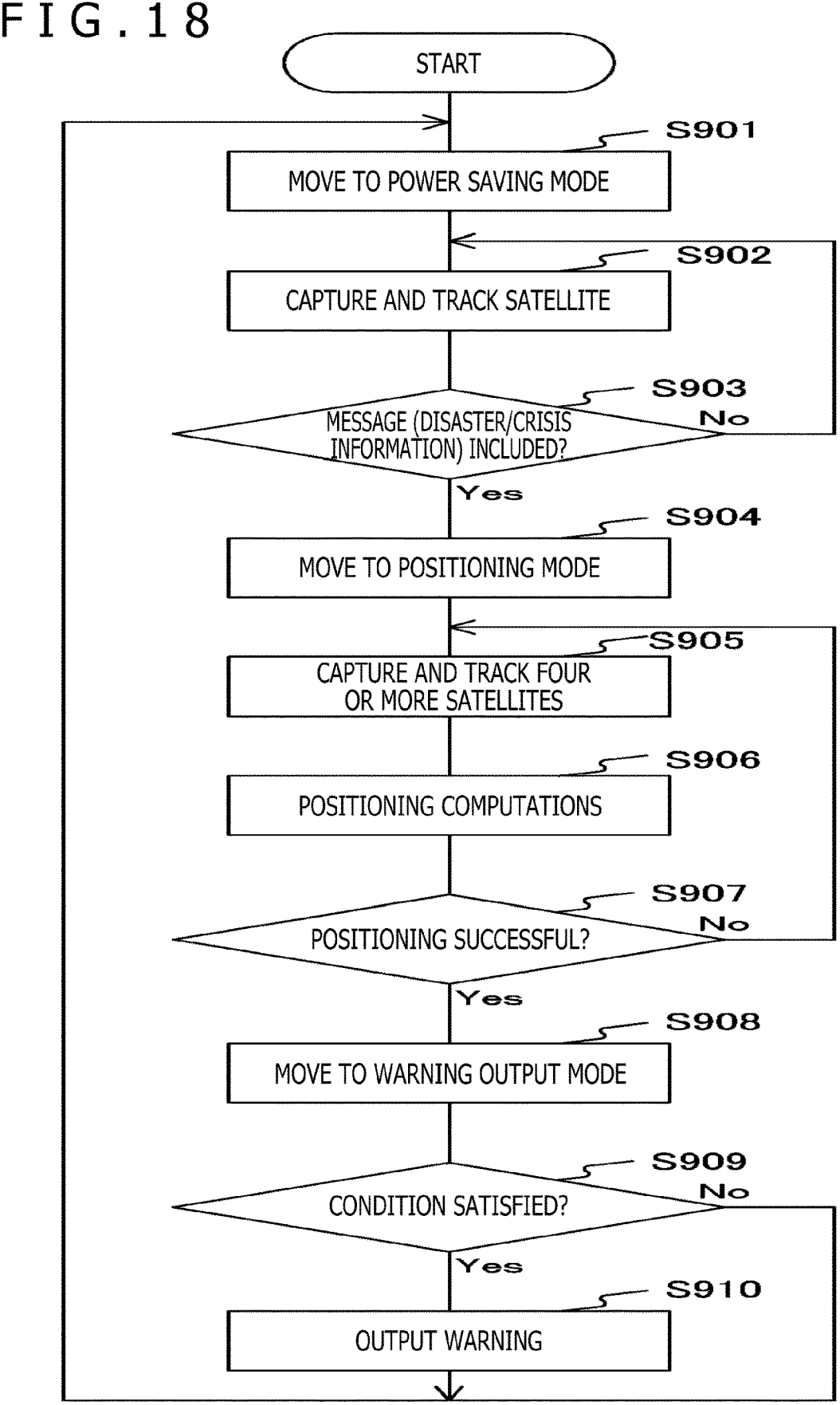
FIG. 18 is a flowchart illustrating an example of operation of the receiver in the first embodiment of the present technology.

FIG. 18 is a flowchart illustrating an example of operation of the receiver 200 in the first embodiment of the present technology. In the receiver 200, this operation is initiated, for example, when a predetermined application is executed to output a warning.

The receiver 200 moves to power saving mode first (step S901). The receiver 200 captures and tracks a quasi-zenith satellite (step S902). Then, the receiver 200 determines whether or not a reception signal includes a disaster/crisis notification message (step S903). In the case where a specific message is not included (No in step S903), the receiver 200 repeats steps after the step S902.

Meanwhile, in the case where a specific message is included (Yes in step S903), the receiver 200 moves to positioning mode (step S904) and captures and tracks four or more satellites (step S905). Then, the receiver 200 performs positioning computations (step S906) and determines whether or not positioning is successful (step S907). In the case where positioning fails (No in step S907), the receiver 200 repeats steps after the step S905.

Meanwhile, in the case where positioning is successful (Yes in step S907), the receiver 200 moves to warning output mode (step S908) and determines whether or not a predetermined condition such as inclusion of the current position within the forecast region is satisfied (step S909). In the case where the predetermined condition is satisfied (Yes in step S909), the receiver 200 outputs a warning (step S910).

In the case where the predetermined condition is not satisfied (No in step S909) or after the step S910, the receiver 200 repeats steps after the step S901 according to a mode changing action or the like.

As described above, according to the first embodiment of the present technology, the receiver 200 performs positioning processes in the case where a reception signal includes a specific message, making it possible to provide reduced power consumption as compared to the case where positioning processes are performed irrespective of the presence or absence of a message.

2. Second Embodiment

Although, in the first embodiment described above, only one quasi-zenith satellite is captured in power saving mode, the quasi-zenith satellite may not be constantly located in a sector of space from which signals can be received (for example, an elevation angle of a sector of space within a given range). If the satellite moves out of the sector of space from which signals can be received, tracking may fail, thus requiring handover for switching the capture target to a new quasi-zenith satellite and resulting in interruption of the reception of a reception signal until the handover is complete. The receiver 200 of the second embodiment differs from that of the first embodiment in that it captures a plurality of quasi-zenith satellites.

Figure 19:
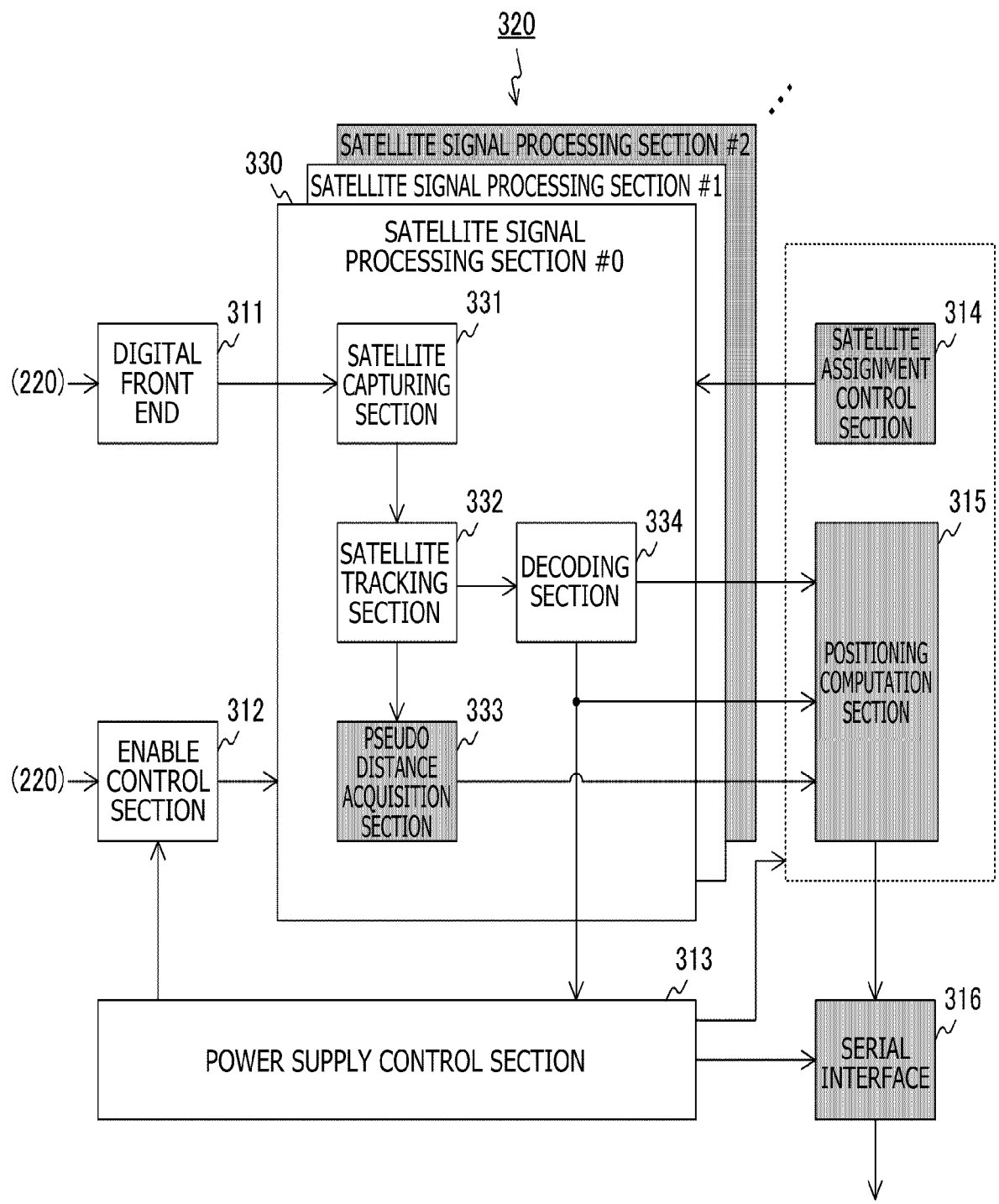
FIG. 19 is a diagram illustrating an example of a receiver in power saving mode in a second embodiment of the present technology.

FIG. 19 is a diagram illustrating an example of the receiver 200 in power saving mode in the second embodiment of the present technology. The receiver 200 of the second embodiment differs from that of the first embodiment in that the power is turned on for the plurality of (for example, the two) satellite processing units 330 in power saving mode. These satellite processing units 330 capture different quasi-zenith satellites, individually, and monitor reception signals from the satellites. If the satellite to be captured moves out of the sector of space from which signals can be received, each of the satellite processing units 330 captures a new quasi-zenith satellite.

Also, when disaster/crisis information is received from any one of the plurality of satellite processing units 330, the positioning computation section 315 of the second embodiment initiates positioning computations.

As described above, according to the second embodiment of the present technology, the receiver 200 monitors respective reception signals of the plurality of quasi-zenith satellites, thus preventing interruption of reception signals even if the tracking of any one of the quasi-zenith satellites fails and providing improved reliability of the receiver 200.

3. Third Embodiment

Although a quasi-zenith satellite is captured without using navigation data (ephemeris data and almanac data) in the first embodiment described above, lack of navigation data may render it impossible to find an orbit of the quasi-zenith satellite, resulting in failed capture or tracking. The receiver 200 of the third embodiment differs from that of the first embodiment in that a satellite is captured by using navigation data.

Figure 20:
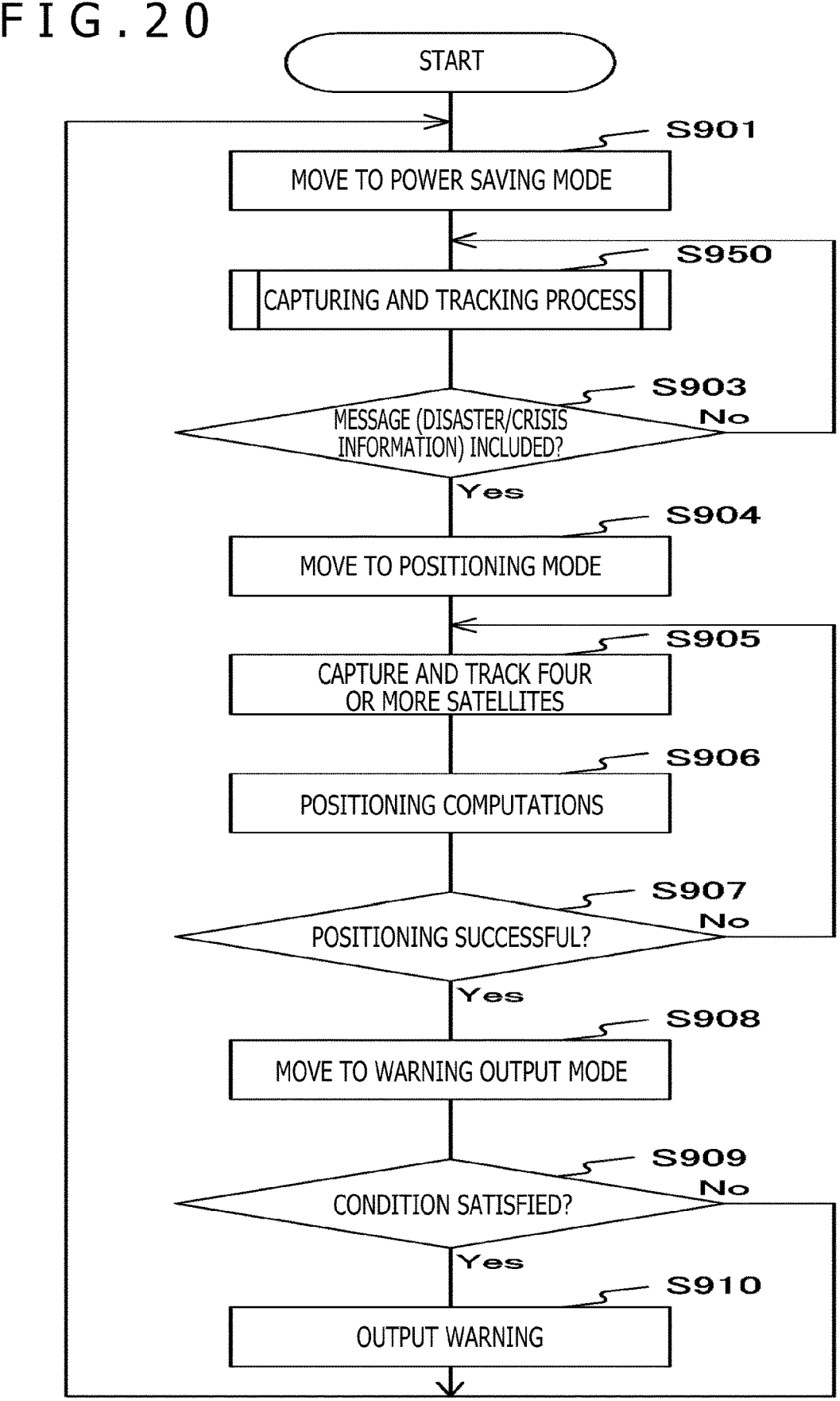
FIG. 20 is a flowchart illustrating an example of operation of a receiver in a third embodiment of the present technology.

FIG. 20 is a flowchart illustrating an example of operation of the receiver 200 in the third embodiment of the present technology. The receiver 200 of the third embodiment differs in operation from that of the first embodiment in that the step S950 is performed instead of the step S902.

The receiver 200 moves to power saving mode (step S901) and performs a satellite capturing and tracking process for capturing and tracking a satellite by using navigation data (step S950). After the satellite capturing and tracking process, the receiver 200 performs steps after the step S903.

Figure 21:
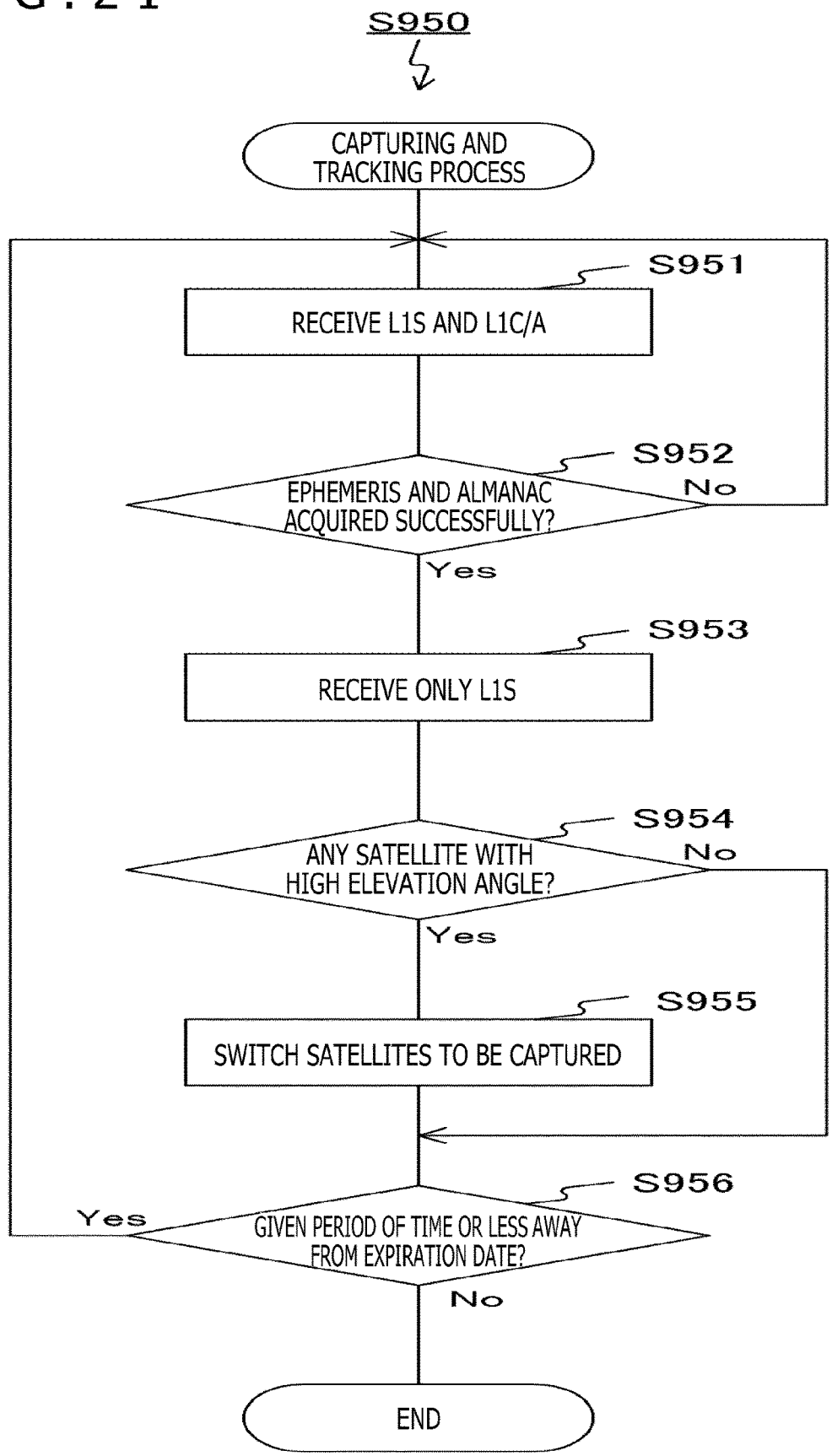
FIG. 21 is a flowchart illustrating an example of a satellite capturing and tracking process in the third embodiment of the present technology.

FIG. 21 is a flowchart illustrating an example of the satellite capturing and tracking process in the third embodiment of the present technology. The satellite processing unit 330 in the receiver 200 captures any one of the quasi-zenith satellites and tracks an L1S signal and an L1 C/A signal from that satellite (step S951). It should be noted that in the case where a plurality of satellites is captured, for example, the satellite with the highest C/A code is tracked. The L1 C/A signal includes coded almanac data and ephemeris data.

The satellite processing unit 330 decodes the L1 C/A signal and determines whether almanac data and ephemeris data have been successfully acquired (step S952). In the case where almanac data and the like have yet to be successfully acquired (No in step S952), the satellite processing unit 330 repeats steps after the step S951.

In the case where almanac data and the like have been successfully acquired (Yes in step S952), the satellite processing unit 330 halts the reception of the L1 C/A signal and will receive only the L1S signal thereafter (step S953).

Then, the satellite processing unit 330 regularly obtains the position of the satellite from almanac data and the like and determines whether or not there is any satellite with a higher elevation angle than the satellite being tracked (step S954). In the case where there is a satellite with a higher elevation angle (Yes in step S954), the satellite processing unit 330 switches the target to be captured over to the new satellite (step S955).

In the case where there is no satellite with a higher elevation angle (No in step S954) or after the step S955, the satellite processing unit 330 determines whether or not the almanac data is a given period of time or less away from an expiration date (step S956). In the case where the almanac data is a given period of time or less away from the expiration date (Yes in step S956), the satellite processing unit 330 repeats steps after the step S951. Meanwhile, in the case where the almanac data is not a given period of time or less away from the expiration date (No in step S956), the satellite processing unit 330 terminates the satellite capturing and tracking process.

As described above, according to the third embodiment of the present technology, a quasi-zenith satellite is captured by using navigation data that indicates the satellite's orbit, thus providing improved probability of successful capturing and tracking as compared to capturing and tracking not using navigation data.

4. Application Example

The technology according to the present disclosure is applicable to technology referred to as what is generally called an IoT (Internet of things) technology. IoT is a mechanism by which an IoT device 9100, a "thing," is connected to other IoT device 9003, the Internet, a cloud 9005, and the like to exchange information and control each other. IoT is applicable to a variety of industries such as agriculture, housing, automobile, manufacturing, distribution, and energy.

FIG. 22 is a diagram illustrating an example of a schematic configuration of an IoT system 9000 to which the technology according to an embodiment of the present disclosure is applicable.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee, and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6LowPAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Further, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

An example of the IoT system 9000 to which the technology according to the present disclosure is applicable has been described above. The technology according to the present disclosure is suitably applicable, of the configurations described above, to the IoT device 9001. Specifically, the receiver 200 in FIG. 1 is applicable to the IoT device 9001. The application of the technology according to the present disclosure to the IoT device 9001 provides reduced power consumption of an IoT device, thus lengthening the operation time of the device.

It should be noted that the above embodiments illustrate examples for realizing the present technology and that there is a correspondence between the matters in the embodiments and the matters defining the invention in the claims. Similarly, there is a correspondence between the matters defining the invention in the claims and the matters in the embodiments of the present technology having the same names. It should be noted, however, that the present technology is not limited to the embodiments and can be realized by modifying the embodiments in various ways without departing from the gist of the present technology.

Also, processing steps described in the above embodiments may be regarded as a method having a series of these steps, a program for causing a computer to perform a series of these steps, or a recording medium storing the program. A CD (Compact Disc), an MD (MiniDisc), a DVD (Digital Versatile Disc), a memory card, a Blu-ray (registered trademark) disc, or the like can be used as this recording medium.

It should be noted that the advantageous effects described in the present specification are merely illustrative and not restrictive, and there may be other advantageous effects.

It should be noted that the present technology can also have the following configurations.

(1)
A receiver including:
a reception section adapted to receive a signal from a predetermined satellite as a reception signal;
a signal processing section adapted to perform a process of determining whether or not the reception signal includes a specific message; and
a positioning process section adapted to perform a positioning process of acquiring a current position in a case where the reception signal includes the specific message.

(2)
The receiver of feature (1), in which
the specific message includes a message that notifies information regarding at least a disaster or a crisis.

(3)
The receiver of feature (1) or (2), in which
the specific message notifies information regarding a disaster, and
the positioning process section performs the positioning process in a case where the reception signal includes the specific message and where the disaster has a predetermined value as a priority level.

(4)
The receiver of any one of features (1) to (3), in which
the specific message notifies information regarding a disaster-hit location, and
the positioning process section outputs a warning on the basis of a positional relation between the disaster-hit location and the current position.

(5)
The receiver of feature (4), in which
the positioning process section outputs a warning on the basis of the positional relation and a transmission condition of the specific message.

(6)
The receiver of any one of features (1) to (5), further including:
a power supply control section adapted to turn off a power for the positioning process section in a case where it is not determined that the reception signal includes the specific message and adapted to turn on the power for the positioning process section in a case where it is determined that the reception signal includes the specific message.

(7)
The receiver of feature (6), in which
the signal processing section includes a plurality of satellite processing units to which different satellites are assigned, individually, and
the power supply control section turns on, of the plurality of satellite processing units, the power for only a predetermined number of satellite processing units in the case where it is not determined that the reception signal includes the specific message and turns on, of the plurality of satellite processing units, the power for more satellite processing units than the predetermined number in the case where it is determined that the reception signal includes the specific message.

(8)
The receiver of feature (7), in which
each of the plurality of satellite processing units includes:
a satellite capturing section adapted to capture the assigned satellite;
a satellite tracking section adapted to track the captured satellite;
a pseudo distance acquisition section adapted to acquire time-of-day information from the reception signal and obtain a pseudo distance to the captured satellite on the basis of the time-of-day information; and
a decoding section adapted to decode a signal from the satellite, and
the power supply control section turns off a power for the pseudo distance acquisition section in the case where it is not determined that the reception signal includes the specific message.

(9)
The receiver of any one of features (1) to (5), further including:
a power supply control section adapted to activate an operating clock of the positioning process section in a case where it is not determined that the reception signal includes the specific message and adapted to deactivate the operating clock of the positioning process section in a case where it is determined that the reception signal includes the specific message.

(10)
The receiver of feature (9), in which
the signal processing section includes a plurality of satellite processing units to which different satellites are assigned, individually, and
the power supply control section activates, of the plurality of satellite processing units, operating clocks of only a predetermined number of satellite processing units in the case where it is not determined that the reception signal includes the specific message and activates, of the plurality of satellite processing units, operating clocks of more satellite processing units than the predetermined number in the case where it is determined that the reception signal includes the specific message.

(11)
The receiver of feature (10), in which
each of the plurality of satellite processing units includes:
a satellite capturing section adapted to capture the assigned satellite;
a satellite tracking section adapted to track the captured satellite;
a pseudo distance acquisition section adapted to acquire time-of-day information from the reception signal and obtain a pseudo distance to the captured satellite on the basis of the time-of-day information; and
a decoding section adapted to decode a signal from the satellite, and
the power supply control section deactivates an operating clock of the pseudo distance acquisition section in the case where it is not determined that the reception signal includes the specific message.

(12)
The receiver of any one of features (1) to (11), in which
the signal processing section monitors the reception signal from each of the plurality of satellites and determines whether or not any one of the reception signals includes the specific message.

(13)
The receiver of any one of features (1) to (12), in which
the signal processing section captures the satellite by using predetermined navigation data.

(14)
The receiver of any one of features (1) to (13), in which
the positioning process section acquires the current position from a pseudo distance to each of a plurality of satellites and predetermined navigation data.

(15)
The receiver of any one of features (1) to (14), in which
the reception section receives a signal from a quasi-zenith satellite as the reception signal.

(16)
A control method of a receiver including:
a reception step of receiving a signal from a predetermined satellite as a reception signal;
a signal processing step of performing a process of determining whether or not the reception signal includes a specific message; and
a positioning process step of performing a positioning process of acquiring a current position in a case where the reception signal includes the specific message.

REFERENCE SIGNS LIST

100 Satellite
200 Receiver
201 Antenna
210 Crystal oscillator
220 Radio-frequency signal processing section
221 Low-noise amplifier
222 Mixer
223 Low-pass filter
224 Phase-locked loop
225 AGC circuit
226 ADC
300 Digital signal processing section
311 Digital front end
312 Enable control section
313 Power supply control section
314 Satellite assignment control section
315 Positioning computation section
316 Serial interface
320 Satellite signal processing section
330 Satellite processing unit
331 Satellite capturing section
332 Satellite tracking section
333 Pseudo distance acquisition section
334 Decoding section
9001 IoT device

The invention claimed is:
1. A receiver comprising:
a reception section adapted to receive a signal from a predetermined satellite as a reception signal;
a signal processing section adapted to perform a process of determining whether or not the reception signal includes a specific message;
a positioning process section adapted to perform a positioning process of acquiring a current position when the reception signal includes the specific message, wherein the specific message notifies information regarding a disaster and directly identifies a disaster type, and the positioning process section performs the positioning process when the reception signal includes the specific message and where the disaster has a predetermined value as a priority level, the priority level being correlated to the identified disaster type; and
a power supply control section adapted to turn on power for the positioning process section when it is determined that the reception signal includes the specific message, wherein
the signal processing section includes a plurality of satellite processing units to which different satellites are assigned, individually, and
the power supply control section turns on, of the plurality of satellite processing units, the power for only a predetermined number of satellite processing units when it is determined that the reception signal does not include the specific message and turns on, of the plurality of satellite processing units, the power for more satellite processing units than the predetermined number when it is determined that the reception signal includes the specific message.

2. The receiver of claim 1, wherein
the specific message notifies information regarding a disaster-hit location, and
the positioning process section outputs a warning on a basis of a positional relation between the disaster-hit location and the current position.

3. The receiver of claim 2, wherein
the positioning process section outputs a warning on a basis of the positional relation and a transmission condition of the specific message.

4. The receiver of claim 1, wherein
each of the plurality of satellite processing units includes:
 a satellite capturing section adapted to capture the assigned satellite;
 a satellite tracking section adapted to track the captured satellite;
 a pseudo distance acquisition section adapted to acquire time-of-day information from the reception signal and obtain a pseudo distance to the captured satellite on a basis of the time-of-day information; and
 a decoding section adapted to decode a signal from the satellite, and
the power supply control section turns off a power for the pseudo distance acquisition section when it is determined that the reception signal does not include includes the specific message.

5. The receiver of claim 1, wherein
the power supply control section is adapted to activate an operating clock of the positioning process section when it is determined that the reception signal does not include the specific message and is adapted to deactivate the operating clock of the positioning process section when it is determined that the reception signal includes the specific message.

6. The receiver of claim 1, wherein
the signal processing section monitors the reception signal from each of the plurality of satellites and determines whether or not any one of the reception signals includes the specific message.

7. The receiver of claim 1, wherein
the signal processing section captures the satellite by using predetermined navigation data.

8. The receiver of claim 1, wherein
the positioning process section acquires the current position from a pseudo distance to each of a plurality of satellites and predetermined navigation data.

9. The receiver of claim 1, wherein
the reception section receives a signal from a quasi-zenith satellite as the reception signal.

10. A receiver comprising:
a reception section adapted to receive a signal from a predetermined satellite as a reception signal;
a signal processing section adapted to perform a process of determining whether or not the reception signal includes a specific message;
a positioning process section adapted to perform a positioning process of acquiring a current position when the reception signal includes the specific message, wherein the specific message notifies information regarding a disaster and directly identifies a disaster type, and the positioning process section performs the positioning process when the reception signal includes the specific message and where the disaster has a predetermined value as a priority level, the priority level being correlated to the identified disaster type; and
a power supply control section adapted to turn on power for the positioning process section when it is determined that the reception signal includes the specific message, and to selectively activate or deactivate operating clocks of the positioning process section when it is determined that the reception signal does or does not include the specific message, wherein
the signal processing section includes a plurality of satellite processing units to which different satellites are assigned, individually, and
the power supply control section activates, of the plurality of satellite processing units, the operating clocks of only a predetermined number of satellite processing units when it is determined that the reception signal does not include the specific message and activates, of the plurality of satellite processing units, the operating clocks of more satellite processing units than the predetermined number when it is determined that the reception signal includes the specific message.

11. The receiver of claim 10, wherein
each of the plurality of satellite processing units includes:
 a satellite capturing section adapted to capture the assigned satellite;
 a satellite tracking section adapted to track the captured satellite;
 a pseudo distance acquisition section adapted to acquire time-of-day information from the reception signal and obtain a pseudo distance to the captured satellite on a basis of the time-of-day information; and
 a decoding section adapted to decode a signal from the satellite, and
the power supply control section deactivates an operating clock of the pseudo distance acquisition section when it is determined that the reception signal does not include the specific message.

12. A control method of a receiver comprising:
receiving a signal from a predetermined satellite as a reception signal;
performing a process of determining whether or not the reception signal includes a specific message;
performing a positioning process of acquiring a current position when the reception signal includes the specific message, wherein
the specific message notifies information regarding a disaster and directly identifies a disaster type, and
performing the positioning process when the reception signal includes the specific message and where the disaster has a predetermined value as a priority level, the priority level being correlated to the identified disaster type; and
turning on power for the positioning process when it is determined that the reception signal includes the specific message, wherein
performing the process of determining whether or not the reception signal includes the specific message implements a plurality of satellite processors to which different satellites are assigned, individually, and
turning on the power is performed for only a predetermined number of the satellite processors when it is determined that the reception signal does not include the specific message and turning on the power is performed for more of the satellite processors than the predetermined number when it is determined that the reception signal includes the specific message.

13. A non-transitory computer readable medium storing program code, the program code being executable by a processor to perform operations comprising:
    receiving a signal from a predetermined satellite as a reception signal;
    performing a process of determining whether or not the reception signal includes a specific message;
    performing a positioning process of acquiring a current position when the reception signal includes the specific message, wherein
    the specific message notifies information regarding a disaster and directly identifies a disaster type, and
    performing the positioning process when the reception signal includes the specific message and where the disaster has a predetermined value as a priority level, the priority level being correlated to the identified disaster type; and
    turning on power for the positioning process when it is determined that the reception signal includes the specific message, wherein
    performing the process of determining whether or not the reception signal includes the specific message implements a plurality of satellite processors to which different satellites are assigned, individually, and
    turning on the power is performed for only a predetermined number of the satellite processors when it is determined that the reception signal does not include the specific message and turning on the power is performed for more of the satellite processors than the predetermined number when it is determined that the reception signal includes the specific message.

14. The non-transitory computer readable medium according to claim 13, wherein the specific message notifies information regarding a disaster-hit location, and wherein the operations further comprise:
    outputting a warning on a basis of a positional relation between the disaster-hit location and the current position.

15. The non-transitory computer readable medium according to claim 14, wherein the operations further comprise:
    outputting a warning on a basis of the positional relation and a transmission condition of the specific message.

* * * * *